United States Patent
Williamson

(10) Patent No.: US 12,453,876 B2
(45) Date of Patent: *Oct. 28, 2025

(54) FIRE SIMULATOR

(71) Applicant: KFT Fire Trainer, LLC, Allendale, NJ (US)

(72) Inventor: Steven J. Williamson, Wayne, NJ (US)

(73) Assignee: KFT FIRE TRAINER, LLC, Allendale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,183

(22) Filed: Feb. 21, 2024

(65) Prior Publication Data

US 2024/0416166 A1    Dec. 19, 2024

Related U.S. Application Data

(63) Continuation of application No. 17/334,154, filed on May 28, 2021, now Pat. No. 11,951,344, which is a
(Continued)

(51) Int. Cl.
  *A62C 99/00*   (2010.01)
  *G09B 9/00*   (2006.01)

(52) U.S. Cl.
  CPC ............ *A62C 99/0081* (2013.01); *G09B 9/00* (2013.01)

(58) Field of Classification Search
  CPC .............................. A62C 99/0081; G09B 9/00
  See application file for complete search history.

(56) References Cited

U.S. PATENT DOCUMENTS 3,675,343 A * 7/1972 Swiatosz ................ G09B 19/00
                                                   434/226
4,001,949 A * 1/1977 Francis .................... G09B 9/00
                                                   434/226
(Continued)

FOREIGN PATENT DOCUMENTS

CA        2467949 A1   11/2004
CA        2590828 A1   12/2007
(Continued)

OTHER PUBLICATIONS

Author Unknown, "Firebase Smoke Generators," Training Smoke, 2017, Retrieved from https://www.trainingsmoke.com/smoke-machines.html, retrieved on Jul. 22, 2019, 3 pages.
(Continued)

*Primary Examiner* — Xuan M Thai
*Assistant Examiner* — Sadaruz Zaman
(74) *Attorney, Agent, or Firm* — COOLEY LLP

(57) ABSTRACT

Some embodiments and methods described herein relate to fire training systems and to fire simulators or fire training apparatus. In some embodiments, an apparatus includes a housing with a surface and an interior volume. A smoke generator is disposed within the interior volume of the housing and is configured to selectively generate smoke. A port is extended between the smoke generator and the surface of the housing and is configured to permit at least a portion of the smoke to be discharged through the port from the smoke generator to an exterior of the housing. A light emitter is coupled to the housing and configured to emit a light. The light and the portion of smoke are collectively configured to simulate a flame or electric arc above the surface of the housing such that the simulated flame or electric arc is viewable from more than 180 degrees about the surface of the housing. A logic controller is disposed within the interior volume of the housing and is configured
(Continued)

to modulate the light and the smoke based on receipt of an extinguishing agent by a predetermined portion of the housing.

20 Claims, 7 Drawing Sheets

Related U.S. Application Data continuation of application No. 15/491,840, filed on Apr. 19, 2017, now Pat. No. 11,020,624.

(60) Provisional application No. 62/324,679, filed on Apr. 19, 2016.

(56) References Cited

U.S. PATENT DOCUMENTS

| | | | |
|---|---|---|---|
| 4,299,579 A | 11/1981 | Swiatosz et al. | |
| 4,303,396 A * | 12/1981 | Swiatosz | G09B 9/00 |
| | | | 434/226 |
| 4,303,397 A | 12/1981 | Swiatosz | |
| 4,861,270 A | 8/1989 | Ernst et al. | |
| 4,983,124 A * | 1/1991 | Ernst | G09B 19/00 |
| | | | 434/226 |
| 5,052,933 A | 10/1991 | Rogers et al. | |
| 5,055,050 A | 10/1991 | Rogers et al. | |
| 5,059,124 A | 10/1991 | Tsujita | |
| 5,099,591 A | 3/1992 | Eiklor et al. | |
| 5,181,851 A | 1/1993 | Layton et al. | |
| 5,226,818 A | 7/1993 | Feiock et al. | |
| 5,233,869 A | 8/1993 | Rogers et al. | |
| 5,266,033 A | 11/1993 | Rogers et al. | |
| 5,316,484 A | 5/1994 | Layton et al. | |
| 5,320,536 A | 6/1994 | Rogers et al. | |
| 5,328,375 A | 7/1994 | Rogers et al. | |
| 5,335,559 A * | 8/1994 | Rogers | A62C 99/0081 |
| | | | 356/438 |
| 5,345,830 A | 9/1994 | Rogers et al. | |
| 5,374,191 A | 12/1994 | Herman et al. | |
| 5,447,437 A | 9/1995 | Joynt et al. | |
| 5,518,402 A * | 5/1996 | Tommarello | G09B 9/00 |
| | | | 434/226 |
| 5,580,146 A | 12/1996 | Maslow | |
| 5,660,549 A * | 8/1997 | Witt, III | A62C 99/0081 |
| | | | 434/21 |
| 5,823,784 A | 10/1998 | Lane | |
| 5,860,479 A | 1/1999 | LaFollette | |
| 5,920,492 A | 7/1999 | Montag et al. | |
| 5,954,517 A | 9/1999 | Hagenlocher | |
| 5,989,128 A | 11/1999 | Baker et al. | |
| 6,003,608 A | 12/1999 | Cunningham | |
| 6,047,489 A | 4/2000 | Hess et al. | |
| 6,129,552 A * | 10/2000 | Deshoux | G09B 19/00 |
| | | | 434/226 |
| 6,363,636 B1 | 4/2002 | Hess et al. | |
| 6,500,008 B1 | 12/2002 | Ebersole et al. | |
| 6,685,574 B2 | 2/2004 | Hall | |
| 6,802,782 B2 | 10/2004 | Hall et al. | |
| 6,866,513 B2 | 3/2005 | Hough | |
| 6,953,401 B2 | 10/2005 | Starr | |
| 7,175,439 B2 * | 2/2007 | Darois | G09B 19/00 |
| | | | 434/226 |
| 7,748,983 B2 * | 7/2010 | Blackburn | A62C 99/0081 |
| | | | 434/226 |
| 7,762,897 B2 | 7/2010 | Starr et al. | |
| 7,809,149 B2 | 10/2010 | Burns | |
| 8,096,810 B2 | 1/2012 | Blackburn et al. | |
| 9,384,673 B1 * | 7/2016 | Jahnke | G09B 9/00 |
| 9,424,834 B2 | 8/2016 | Simmons et al. | |
| 9,478,146 B2 | 10/2016 | Skinner et al. | |
| 9,548,004 B1 * | 1/2017 | Egelin, Jr. | G09B 19/00 |
| 9,728,100 B2 * | 8/2017 | Blackburn | G09B 19/00 |
| 9,747,811 B2 * | 8/2017 | Blackburn | G09B 9/00 |
| 9,763,016 B2 | 9/2017 | Merks et al. | |
| 9,773,424 B2 * | 9/2017 | Blackburn | G09B 19/00 |
| 10,522,051 B2 * | 12/2019 | Russell | G09B 19/00 |
| 10,540,908 B2 * | 1/2020 | Blackburn | G09B 19/00 |
| 10,573,195 B1 | 2/2020 | Egelin, Jr. et al. | |
| 10,783,880 B2 | 9/2020 | Ash et al. | |
| 11,020,624 B2 * | 6/2021 | Williamson | G09B 9/00 |
| 11,951,344 B2 | 4/2024 | Williamson | |
| 12,154,458 B2 * | 11/2024 | Bradley | H04B 1/3833 |
| 2003/0121672 A1 * | 7/2003 | Spaniol | A62C 99/0081 |
| | | | 169/5 |
| 2003/0175662 A1 | 9/2003 | Hough | |
| 2004/0191736 A1 | 9/2004 | Werhun | |
| 2004/0221518 A1 | 11/2004 | Westra | |
| 2006/0131038 A1 | 6/2006 | Lichtig | |
| 2006/0240392 A1 | 10/2006 | Clifton | |
| 2007/0218436 A1 | 9/2007 | Blackburn et al. | |
| 2009/0197229 A1 | 8/2009 | Blackburn | |
| 2011/0142429 A1 | 6/2011 | Joseph | |
| 2011/0186657 A1 | 8/2011 | Haviland | |
| 2012/0061108 A1 | 3/2012 | Cerrano | |
| 2012/0138051 A1 | 6/2012 | Curran et al. | |
| 2014/0266742 A1 | 9/2014 | Rennie | |
| 2015/0079557 A1 * | 3/2015 | Blackburn | G09B 9/00 |
| | | | 434/226 |
| 2015/0079558 A1 | 3/2015 | Blackburn et al. | |
| 2015/0079559 A1 | 3/2015 | Blackburn et al. | |
| 2017/0296855 A1 | 10/2017 | Williamson | |
| 2017/0343889 A1 | 11/2017 | Riel et al. | |
| 2017/0373045 A1 | 12/2017 | Welch et al. | |
| 2019/0003681 A1 | 1/2019 | Yamae | |
| 2019/0118016 A1 * | 4/2019 | Severijns | G09B 19/00 |
| 2022/0016460 A1 | 1/2022 | Williamson | |
| 2022/0023692 A1 * | 1/2022 | Bradley | G01N 27/223 |
| 2022/0114904 A1 * | 4/2022 | Bradley | G09B 9/00 |

FOREIGN PATENT DOCUMENTS

| | | |
|---|---|---|
| CN | 104240547 A | 12/2014 |
| CN | 204759806 U | 11/2015 |
| EP | 0718815 | 6/1996 |
| WO | WO-9002393 A1 | 3/1990 |
| WO | WO-9417507 A1 | 8/1994 |
| WO | WO-03015057 A1 | 2/2003 |
| WO | WO-2005094232 A2 | 10/2005 |
| WO | WO-2007117795 A2 | 10/2007 |
| WO | WO-2015039091 A1 | 3/2015 |
| WO | WO-2015039092 A1 | 3/2015 |
| WO | WO-2015039093 A1 | 3/2015 |
| WO | WO-2016080590 A1 | 5/2016 |
| WO | WO-2017184782 A1 | 10/2017 |

OTHER PUBLICATIONS

Author Unknown, "GeyserTM P6 Cryo/Pyro Simulator," Theatre Effects, Retrieved from http://www.theatrefx.com/moreinfo-chauvet-geyser-rgb-fog-cryo-pryo-machine.html, retrieved on Mar. 31, 2017, 2 pages.

Author Unknown, "Smoke Generators," Fire Product Search, publication date unknown, Retrieved from https://www.fireproductsearch.com/category/simulated-fire-training/smoke-generators/, retrieved on Jul. 22, 2019, 8 pages.

Author Unknown, "Smoke Generators," Firehouse, published on Feb. 26, 2011, at https://www.firehouse.com/prevention-investigation/article/10463539/smoke-generators, retrieved on Jul. 22, 2019, 5 pages.

Bullex, "The BullEx Attack Digital Fire Training System," BullEx, May 1, 2014, Retrieved from the Internet at https://www.youtube.com/watch?annotation_id=annotation_3963179033&feature=iv&src_vid=X6VNqrGSulY&v=otM-V_zYDjM#t=2s on May 7, 2018, printed copy of webpage, closed captioning transcript, and printed version of online video, 217 pages.

Bullex, "The BullEx Attack Digital Fire Training System," BullEx, Oct. 3, 2013, Retrieved from the Internet at https://www.youtube.com/watch?v=X6VNqrGSulY on May 7, 2018, printed copy of webpage, closed captioning transcript, and printed version of online video, 210 pages.

(56) References Cited

OTHER PUBLICATIONS

International Search Report and Written Opinion for PCT/US2017/028448, dated Jul. 6, 2017, 16 pages.

* cited by examiner

FIRE SIMULATOR

CROSS-REFERENCE TO RELATED APPLICATION(S)

This application is a continuation of U.S. patent application Ser. No. 17/334,154, now U.S. Pat. No. 11,951,344, entitled "FIRE SIMULATOR," filed May 28, 2021, which is a continuation of U.S. patent application Ser. No. 15/491,840, now U.S. Pat. No. 11,020,624, entitled "FIRE SIMULATOR," filed Apr. 19, 2017, which claims priority to and the benefit of U.S. provisional application Ser. No. 62/324,679, entitled "FIRE SIMULATOR," filed Apr. 19, 2016, each of which is incorporated by reference herein in its entirety.

BACKGROUND

Some embodiments described herein relate generally to fire training systems and fire simulators, and more particularly, to a fire simulator configured to produce a dynamic representation of a fire that is viewable from more than 180 degrees about the dynamic representation of the fire.

Some known training systems for firefighting search and rescue operations have limited viewability during a training episode. For example, one known system includes a vertically positioned video screen that displays a video image of a fire. As such, the image of the fire can only be viewed from one side of the video screen, and thus the viewing angle of the video screen, and thus the image displayed thereon, is limited to, at best, a maximum of 180 degrees.

Other known systems are limited in or lack the ability to simulate multiple dynamic conditions of a fire scenario. For example, one known system includes a light box and a single sound production mechanism. This known system, however, lacks the ability to dynamically change the characteristics of either the light or of the sound. The system also lacks the ability to generate additional characteristics that may be associated a fire, such as smoke, heat, or the like.

In another example, some known systems include multiple separate components to achieve multiple dynamic conditions. As such, such known systems can be expensive and lack portability such that the system can be used in a large number of indoor and/or outdoor environments.

Additionally, known systems and apparatus often lack the ability to wirelessly communicate with other components of the known system or to wirelessly communicate with an additional fire simulation apparatus or training system, and thus have a limited or no ability be to be integrated into or interfaced with such additional fire training systems or apparatus.

Thus, a need exists for a fire simulation apparatus that can produce a dynamic representation of a fire that is viewable from more than 180 degrees about the dynamic representation of the fire. A need also exists for an apparatus that can simulate multiple dynamic conditions associated with a fire. A need further exists for an apparatus that can be integrated into and/or interfaced with another fire simulation apparatus and/or live fire training systems.

SUMMARY

Some embodiments and methods described herein relate to fire training systems and to fire simulators or fire training apparatus. In some embodiments, an apparatus includes a housing with a surface and an interior volume. A smoke generator is disposed within the interior volume of the housing and is configured to selectively generate smoke. A port is extended between the smoke generator and the surface of the housing and is configured to permit at least a portion of the smoke to be discharged through the port from the smoke generator to an exterior of the housing. A light emitter is coupled to the housing and configured to emit a light. The light and the portion of smoke are collectively configured to simulate a flame or electric arc above the surface of the housing such that the simulated flame or electric arc is viewable from more than 180 degrees about the surface of the housing. A logic controller is disposed within the interior volume of the housing and is configured to modulate the light and the smoke based on receipt of an extinguishing agent by a predetermined portion of the housing.

DETAILED DESCRIPTION

Figure 1:
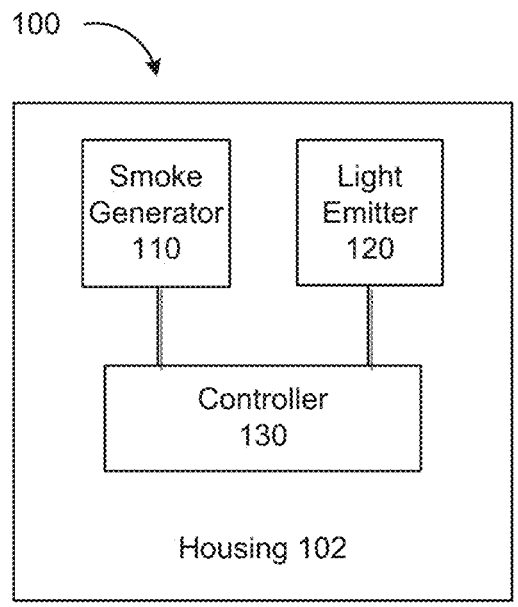
FIG. 1 is a schematic view of a fire simulation apparatus according to an embodiment.

Fire simulators and fire simulation systems are described herein, as well as methods of their use. In some embodiments, an apparatus includes a housing with a surface and an interior volume. A smoke generator is disposed within the interior volume of the housing and is configured to selectively generate smoke. A port is extended between the smoke generator and the surface of the housing, and is configured to permit at least a portion of the smoke to be discharged through the port from the smoke generator to an exterior of the housing. A light emitter is coupled to the housing and configured to emit a light. The light and the portion of smoke are collectively configured to simulate a flame or electric arc above the surface of the housing such that the simulated flame or electric arc is viewable from more than 180 degrees about the surface of the housing. A logic controller is disposed within the interior volume of the housing and is configured to modulate the light and the smoke based on or in response to receipt of an extinguishing agent by a predetermined portion of the housing.

In some embodiments, an apparatus includes a housing having a top portion, a bottom portion configured to be disposed on a support surface, and an interior volume between the top portion and the bottom portion. The housing defines a first port and a second port different from the first port. A smoke generator is disposed within the interior volume of the housing. The smoke generator is configured to generate smoke. As referred to herein, and unless the context clearly dictates otherwise, reference herein to "smoke" that is generated by the smoke generator refers to theatrical smoke or fog, also known as special effect smoke or fog, which is often used in the entertainment industry to produce an atmospheric effect. Such smoke can be produced using any suitable solution, including, but not limited to, glycol solutions (such as 1,3-butylene glycol, diethylene glycol, propylene glycol, triethylene glycol, or mixtures thereof). Such smoke can be produced in any suitable manner, including for example, vaporization or aerosolization, for example, of a theatrical smoke fluid. For example, the smoke generator can be configured to generate smoke by vaporizing or aerosolizing a solution of propylene glycol and water. Smoke, as used herein, can also refer to smoke generated with the use of pyrotechnics.

The first port of the housing is configured to permit the smoke to be discharged from the smoke generator within the interior volume of the housing to outside the housing such that at least a portion of the discharged smoke is positioned vertically with respect to the housing. A set of light emitters is coupled to the housing. The set of light emitters is configured to emit light in response to a second signal received from the logic controller. The set of light emitters is configured to emit the light towards the portion of the discharged smoke. A sound system is at least partially disposed within the interior volume of the housing. The sound system is configured to output at least one audio recording from a set of audio recordings. A sensor is disposed within the housing. The sensor is configured to detect an extinguishing agent received by the housing via the second port. A logic controller is disposed in the interior volume of the housing. The logic controller is configured to selectively control operation of the smoke generator, the set of light emitters and the sound system such that the apparatus outputs a dynamic visual and audible representation of a fire, and such that the dynamic visual representation of the fire is viewable from an angle greater than 180 degrees with respect to a vertical axis of the dynamic visual representation of the fire. The logic controller is configured to modulate operation of at least one of the smoke generator, the set of light emitters or the sound system based on or in response to a signal received from the sensor associated with detection of the extinguishing agent.

In some embodiments, a method includes discharging smoke from a smoke generator disposed within an interior volume of a housing through a port of the housing. The method includes emitting light from a set of light emitters, such that the light has a first set of characteristics. The set of light emitters is coupled to the housing. The emitted light and the discharged smoke collectively produce a dynamic representation of a fire vertically disposed with respect to the housing such that the dynamic representation of the fire is viewable from greater than 180 degrees about a vertical axis of the dynamic representation of the fire. The method includes outputting an audio recording from a sound system at least partially disposed within the interior volume of the housing. The audio recording includes a sound associated with a fire. The method includes detecting the presence of an extinguishing agent. The method includes modulating, via a logic controller disposed within the interior volume of the housing, at least one characteristic of at least one of the smoke, the light, or the audio recording.

As used in this specification and the appended claims, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and/or "approximately" when used in conjunction with numerical values and/or ranges generally refer to those numerical values and/or ranges near to a recited numerical value and/or range. For example, in some instances, "about 40 [units]" can mean within ±25% of 40 (e.g., from 30 to 50). In some instances, the terms "about" and "approximately" can mean within ±10% of the recited value. In other instances, the terms "about" and "approximately" can mean within ±9%, ±8%, ±7%, ±6%, ±5%, ±4%, ±3%, ±2%, ±1%, less than ±1%, or any other value or range of values therein or therebelow. The terms "about" and "approximately" may be used interchangeably. Furthermore, although a numerical value modified by the term "about" or "approximately" can allow for and/or otherwise encompass a tolerance of the stated numerical value, it is not intended to exclude the exact numerical value stated.

In a similar manner, term "substantially" when used in connection with, for example, a geometric relationship, a numerical value, and/or a range is intended to convey that the geometric relationship (or the structures described thereby), the number, and/or the range so defined is nominally the recited geometric relationship, number, and/or range. For example, two structures described herein as being "substantially parallel" is intended to convey that, although a parallel geometric relationship is desirable, some non-parallelism can occur in a "substantially parallel" arrangement. By way of another example, a simulated fire viewable from an angle that is "substantially 360 degrees" is intended to convey that, while the recited angle is desirable, some tolerances can occur when the angle is "substantially" the recited angle (e.g., 360 degrees). Such tolerances can result from manufacturing tolerances, measurement tolerances, and/or other practical considerations (such as, for example, minute imperfections, age of a structure so defined, a pressure or a force exerted within a system, and/or the like). As described above, a suitable tolerance can be, for example, of ±1%, ±2%, ±3%, ±4%, ±5%, ±6%, ±7%, ±8%, ±9%, ±10%, or more of the stated geometric construction, numerical value, and/or range. Furthermore, although a numerical value modified by the term "substantially" can allow for and/or otherwise encompass a tolerance of the stated numerical value, it is not intended to exclude the exact numerical value stated.

While numerical ranges may be provided for certain quantities, it is to be understood that these ranges can include all subranges therein. Thus, the range "from 180 to 360" includes all possible ranges therein (e.g., 180-270, 185-270, 185-360 . . . 270-360, etc.). Furthermore, all values within a given range may be an endpoint for the range encompassed thereby (e.g., the range 180-360 includes the ranges with endpoints such as 181-359, 225-320, etc.).

The systems and apparatus described herein can be used, for example, in fire fighting training scenarios. The systems and apparatus described herein are configured to simulate one or more of Class A fires (e.g., fires involving combustible solids, like wood, paper, cloth, or the like), Class B fires (e.g., fires involving flammable liquids and gases, like gasoline, paint, propane, or the like), Class C fires (e.g., fires involving energized electrical equipment), Class D fires (e.g., fires involving combustible metals, such as potassium, aluminum, magnesium or the like), or Class K fires (fires involving cooking oils and greases), or any combination thereof. For example, an apparatus according to an embodiment is configured to simulate Class A, Class B and Class C fires, for example by producing one or more of a lighting effect, a smoke effect, a sound effect, or a thermal effect, or any combination of the foregoing, associated with the class of fire to be simulated. The apparatus is configured to produce one or more of the foregoing effects, to simulate the desired class of fire, without actually producing or emitting the fire. Said another way, the apparatus is configured to output from the apparatus a dynamic representation of a fire and/or conditions associated with a fire without also concurrently outputting from the apparatus an actual flame or electrical arc.

As described in more detail herein, such an apparatus can be included in a fire fighting training system. For example, a system according to an embodiment includes two or more devices, such as the fire simulation apparatus described above, each of which is configured to simulate a fire and each of which is operatively coupled to at least one other device of the system. In this manner, the system can be configured to simulate a fire scenario representative of an actual fire, for example, in which multiple instances of fire may exist indoors (e.g., within a building, housing, or other structure) and/or outdoors (e.g., a backyard, a field or other outdoor environment). Also in this manner, the system can be configured to simulate a fire scenario representative of a spreading fire.

As also described in more detail herein, such a fire simulation apparatus or device can be included in a fire fighting training system that includes a live fire training device or subsystem. "Live fire," as used herein and unless the context clearly dictates otherwise, refers to a real (or non-simulated) fire, which may include the presence of a real flame.

Thus, the embodiments described herein are useful for firefighting training, for example, in that fire scenarios can be reproduced or simulated without the danger, or with a lesser degree of danger, than that which may otherwise be present when one or multiple live fires are used for training purposes.

FIG. 1 is a schematic illustration of an apparatus 100 according to an embodiment. The apparatus 100 includes a housing 102, a smoke generator 110, at least one light emitter 120, and a controller 130. The housing 102 is configured to at least partially house other components of the apparatus, such as the smoke generator 110, the light emitter(s) 120, and the controller 130, as described herein. In some arrangements, one or more components of the apparatus 100 are wholly enclosed within the housing 102. The housing 102 includes a surface and defines an interior volume. For example, the housing 102 can include an upper surface, a lower surface and/or a side surface (e.g., one or more outer wall portions). The interior volume of the housing 102 can be defined, at least in part, by one or more of the upper surface, lower surface or side surface, or a combination thereof.

In some embodiments, the housing 102 has a top portion and a bottom portion. The top portion of the housing 102 can include, for example, at least the upper surface of the housing. The bottom portion of the housing 102 can include, for example, at least the lower surface of the housing. In some arrangements, the bottom portion of the housing 102 is configured to be disposed on a support surface. The support surface can include a floor, lawn, pavement, other ground surface, furniture, vehicle, equipment, or any other suitable support surface. In some implementations, the housing can be configured to float on a liquid support surface. In some implementations, the housing 102 includes one or more leg members configured to space the lower surface of the housing 102 apart from the support surface, for example by one or more inches or one or more feet. For example, the bottom portion of the housing 102 can include one, two, three, four or more leg members configured to space the lower surface of the housing 102 apart from the support surface when the bottom portion of the housing is disposed on the support surface. In some embodiments, the top portion of the housing 102 includes a retaining element configured to facilitate suspension of the housing from a surface disposed above the housing (e.g., a ceiling, rafter, scaffold, tree, crane, or other suitable structure).

In some embodiments, the housing 102 includes a port (not shown in FIG. 1). For example, in some embodiments, the housing 102 includes a port configured to fluidically couple at least a portion of the interior volume of the housing to outside of the housing (e.g., to ambient air surrounding the apparatus 100). The port can be defined by the housing 102. The port can be coupled to the housing 102. In some implementations, the port extends from the surface of the housing 102. In some implementations, the housing 102 includes a port configured to permit smoke produced within the housing, as described in more detail herein, to be discharged through the port to an exterior of the housing 102. For example, in some embodiments, the housing 102 can include a lumen that is extended at least between the smoke generator 110 and the port disposed at the surface of the housing. In this manner, the port can permit smoke from the smoke generator 110 to be discharged from the smoke generator within the interior volume of the housing 102 to outside the housing, for example, without filling the interior volume of the housing with the smoke.

In some embodiments, the port is located or positioned with respect to the surface of the housing 102 such that at least a portion of the discharged smoke is positioned vertically with respect to the housing 102. For example, the port can be included in a top portion of the housing 102 such that at least a portion of the discharged smoke is positioned vertically above (e.g., directly overhead of) the housing 102. In some arrangements, the port is included in a bottom portion of the housing 102 such that at least a portion of the discharged smoke is positioned vertically below (e.g., directly beneath) the housing 102. In some arrangements, the port is disposed on or defined by the housing such that at least a portion of the discharged smoke is positioned with respect to the housing on a side (e.g., above, below, or beside) of the housing opposite the support surface. In some arrangements, the port has a central axis and the smoke is configured to be discharged via the port in a direction parallel to and/or aligned with the central axis of the port. In some arrangements, the housing 102 includes a port by which the housing is configured to receive at least a portion of an extinguishing agent, as described in more detail herein.

The housing 102 is impervious (e.g., waterproof) such as liquid-resistant. In this manner, the housing 102 is configured to protect components housed therein from being contacted by, and possibly damaged by, a liquid extinguishing agent (e.g., water, foam, or the like). More specifically, in some implementations, at least a portion of the housing 102 is impervious or resistant to fluid (and, optionally, gas) such that the housing 102 is configured to prevent or resist the fluid (or gas) from contacting internal components of at least one of the light emitters 120, the smoke generator 110, or the controller 130. In some implementations, the housing 102 is impervious or liquid-resistant, except for a port defined by the housing (e.g., the port configured to receive at least a portion of the extinguishing agent or the port configured to discharge smoke from the housing). The housing 102, for example, can be constructed of a metal or a plastic, including, but not limited to, stainless steel, painted steel, aluminum, molded plastic, or the like.

In some implementations, the housing 102 includes at least one door or hatch (not shown in FIG. 1) configured to provide access to the interior volume and/or a component of the apparatus 100 at least partially disposed within the interior volume. The housing 102 can include a seal, flange, or the like disposed about the perimeter of the door to help prevent or resist liquid (or gas) from passing therethrough. As discussed above, in some implementations, the housing 102 includes one or more leg members configured to be disposed on a support surface. Such leg members can be configured to space the housing 102 away from the support surface by a predetermined distance such that the housing 102 is spaced apart from a volume of extinguishing agent that may accumulate on the support surface.

The housing 102 can have any suitable size. Generally, the housing 102 is sufficiently large to at least partially house other components of the apparatus 100 described herein. For example, in some implementations, the housing 102 has a height of up to about five (5) feet. For another example, the housing 102 can have a height within the range of about twelve (12) inches to about thirty-six (36) inches. In yet another example, the housing 102 can have a height within the range of about sixteen (16) inches to about twenty-four (24) inches. The housing 102 can have an overall width of up to about five (5) feet. For another example, the housing 102 can have a width within the range of about twelve (12) inches to about thirty-six (36) inches. In yet another example, the housing 102 can have a width within the range of about sixteen (16) inches to about twenty-four (24) inches. In some implementations, the housing 102 has a height less than its width, and thus has an overall low profile, which can help to prevent tipping of the apparatus 100 when impacted by pressurized application of an extinguishing agent (e.g., pressurized stream of water or foam from a fire extinguisher or fire hose). In some implementations, the apparatus 100 is of sufficient weight such that the apparatus retains itself in a predetermined (e.g., upright) position when the apparatus is attacked or impacted by a pressurized application of the extinguishing agent. For example, the apparatus 100 can have a weight of up to about 100 pounds (lbs), or more particularly within the range of about fifty (50) lbs. to about eighty (80) lbs.

The smoke generator 110 of the apparatus 100 is at least partially, or completely, disposed within the interior volume of the housing 102. The smoke generator 110 is configured to generate smoke. The smoke generator 110 can include or be similar to a theatrical smoke machine or fog machine. The smoke generator 110 can be an electro-mechanical unit that can include a heating element (not shown in FIG. 1), electronic circuitry, and optionally a pump (not shown in FIG. 1). The electronic circuitry is operatively coupled to the heating element to maintain the heating element within a predetermined range of temperatures, when the smoke generator 110 is in use. In use, the smoke fluid is moved (e.g., via the pump, pressure, gravity, or the like) through the heating element such that the fluid is vaporized to form smoke vapor. The smoke fluid can be a water-based fluid, such as glycol and water, or an oil-based fluid. In some embodiments, the smoke generator 110 can include a fan configured to help discharge the smoke (or smoke vapor) from the apparatus 100.

In some implementations, the smoke generator 110 can be configured to selectively generate smoke. For example, the smoke generator 110 can be configured to generate smoke in response to a command or signal received from the controller 130. The smoke generator 110 can be configured to generate smoke having one or more predetermined characteristics, such as volume, density, or other suitable characteristic, for example, based on the command or signal received from the controller 130. The smoke is configured to redirect light emitted thereon (e.g., refraction and/or scattering) such that the smoke can visually appear to glow, thereby simulating the appearance of a flame or electrical arc.

The smoke generator 110 can be configured for variable output of smoke. In some embodiments, the smoke generator 110 is configured to generate at a first time a first volume of smoke having a first set of characteristics and to generate at a second time, later than the first time, a second volume of smoke having a second set of characteristics. The first set of characteristics can be associated with, for example, a first class (or combination of classes) of fire, a first intensity of fire, a first stage of fire, or the like, and the second set of characteristics can be associated with, for example, a second class of fire, a second intensity of fire, a second stage of fire, or the like. In this manner, the smoke generator 110 can facilitate simulation of fire at different stages, such as a small fire (e.g., an incipient stage fire), a medium fire (e.g., a growth stage fire), a large fire (e.g., fully-developed stage fire) or a decaying fire or a fire close to being extinguished. Also in this manner, the smoke generator 102 can facilitate simulation of extinguishment of a fire, with a greater volume and/or more dense smoke generated at the first time and a lesser volume and/or less dense smoke generated at the second time. In some implementations, the smoke generator 110 is configured to transition from generation of the first volume of smoke to generation of the second volume of smoke without an interruption in smoke generation.

The smoke generator 110 can be configured to discharge at least a portion of the smoke, such as via one or more ports of the housing. In this manner, the apparatus 100 is configured to discharge at least a portion of the smoke such that the portion of the smoke is vertically disposed with respect to the housing 102, as described herein.

The smoke generator can be configured to generate smoke using, for example theatrical smoke fluid (e.g., a mixture of water and propylene glycol). In some embodiments, the apparatus 100 includes a reservoir (e.g., disposed within the interior volume of the housing 102) configured to contain a volume of the smoke fluid.

The light emitter 120 is configured to emit light, to facilitate simulation of a dynamic representation of a fire, as described herein. The light emitter 120 is coupled to the housing 102. In some arrangements, the light emitter 120 can be disposed on or coupled directly to the surface of the housing 102. In some arrangements, the light emitter 120 can be at least partially disposed in the interior volume of the housing 102. In some implementations, the light emitter 120 includes a light emitting diode ("LED"), or multiple LEDs. In some implementations, the light emitter can include one or more of a LED, a strobe light, a laser, an incandescent light bulb, a halogen lamp, a fluorescent light, fiber optics, or a combination thereof.

The light emitter 120 can include one or more light emitters, which can be arranged in any suitable configuration with respect to the housing 102. For example, the light emitters 120 can be arranged in a pattern (e.g., on the surface of the housing 102), for example, in two or more parallel rows, in two or more staggered parallel rows, in concentric circles, in a circular, ellipsoidal, rectangular, square, diamond, star or other desired shaped pattern.

The light emitter 120 can be configured to emit light towards a volume of space adjoining the housing 102. For example, in some embodiments, the light emitter 120 is configured to emit light in a direction parallel to, or the same as, the direction in which smoke is discharged from the housing 102. In another example, the light emitter 120 is configured to emit light towards a volume of space adjoining the housing 102, such as in a vertical direction with respect to (e.g., overhead or beneath) the housing 102. More particularly, the light emitter 120 is configured to emit light towards at least a portion of the smoke discharged from the housing 102. In some embodiments, the light emitter 120 is configured to emit the light such that the light transmits a non-zero distance beyond the surface of the housing 102, for example up to five feet, up to ten feet, up to fifteen feet, or up to twenty feet beyond the surface of the housing 102.

The light is configured to be redirected by at least a portion of the discharged smoke, which can cause the portion of smoke to appear as though it is glowing or which can otherwise cause the portion of smoke to appear illuminated. In this manner, the light emitted by the light emitter 120 and the portion of smoke are collectively configured to simulate a flame or electric arc above the surface of the housing 102.

The light emitted by the light emitter 120 and at least the portion of discharged smoke are collectively configured to simulate the flame or electric arc above the surface of the housing 102 such that the simulated flame or electric arc is viewable from more than 180 degrees about the surface of the housing 102. Said another way, the light and discharged smoke are collectively configured to produce a dynamic representation of a fire that is viewable from more than 180 degrees about a vertical axis or centerline of at least one of the apparatus 100, the emitted light, or the surface of the housing 102. In some embodiments, the dynamic representation of the fire (or the simulated flame or electric arc) is viewable from an angle within the range of more than 180 degrees up to 360 degrees (e.g., more than about 190 degrees, more than about 220 degrees, more than about 235 degrees, more than about 270 degrees, more than about 315 degrees). For example, in some embodiments, the dynamic representation of the fire (or the simulated flame or electric arc) is viewable from an angle within the range of 270 degrees to 360 degrees about the surface of the housing 102. In another example, in some embodiments, the dynamic representation of the fire (or the simulated flame or electric arc) is viewable from about 360 degrees about the surface of the apparatus 100.

Such angle of viewability of the simulated fire is a significant improvement over known fire training systems that may, at best, provide a simulated fire that is viewable from no more than 180 degrees (e.g., on a substantially flat screen, monitor, television, or the like). More particularly, the increased angle of viewability provides an advantage over known two dimensional fire simulation systems because the simulation is a more accurate representation of actual circumstances that may be encountered by a fire fighter in a live fire event.

The light emitter 120 can be configured to selectively emit light having a predetermined set of characteristics. The light characteristics can include, but are not limited to, wavelength, intensity, color, pattern of emission (e.g., continuous, pulsing, intermittent or the like), duration of emission, or the like. The characteristic(s) of the light can be determined, for example, based on one or more signals received by the light emitter 120 from the controller 130. In some arrangements, a predetermined program can be used to control the characteristics of the light.

The light emitter(s) 120 can be configured to emit light in any suitable color, including red, amber, white and blue. In some embodiments, the light emitter(s) 120 can be configured to emit multicolored light. For example, the light emitter(s) 120 can be configured to emit light having at least two different colors, including at least two of red, amber, white and blue.

The light color, or combination of colors, is configured to produce a simulated representation of a flame or electrical arc when the light is redirected (e.g., by smoke). For example, the light emitter(s) 120 can be configured to substantially concurrently emit red and amber colored light to produce a representation of a flame. In another example, the light emitter(s) 120 can be configured to substantially concurrently emit red, amber, blue and white colored light to produce a representation of a flame or flames having greater intensity or heat than a flame simulated with only red and amber lights. In yet another example, the light emitter(s) 120 can be configured to substantially concurrently emit blue and white colored light to produce a representation of an electrical arc. In some implementations, the apparatus 100 can include a series or set of light emitters of different colors to produce visual flame or arcing effects.

The color of the light can be selectively emitted based on a signal received from the controller 130. The color of the light can be modulated during use of the apparatus 100 based on a signal received from the controller 130. For example, the controller 130 can send a signal to the light emitter 120 to change the color of the light or combination of colors of the light during use.

In some implementations, the light emitter 120 can be configured to change, during use, the light emitted, such as based on the predetermined program and/or based on a signal received (e.g., during use) from the controller 130. Said another way, the light emitter 120 can be configured to emit at a first time (or during a first time period) light having a first set of characteristics and to emit light at a second time (or during a second time period), after the first time light having a second set of characteristics different from the first set of characteristics. In this manner, the characteristics of the light being emitted by the light emitter 120 can be changed over time, which can be used to help simulate a fire that increases or decreases in intensity over time, to help simulate a resurgence of a fire, to help simulate a change in class of fire (e.g., from Class C to Class A) during a fire training scenario.

For example, in some instances, the light emitter 120 can be configured to emit, at a first time, light having a first set of characteristics, including blue and white colored light representative of an electrical fire. The light emitter 120 can be configured to emit, at a second time, light having a second set of characteristics, including blue, white, red and amber colored light representative of an electrical fire that also includes combusted solids. The light emitter 120 can be configured to emit at a third time, light having a third set of characteristics, including red and amber colored light, but no blue and white light, representative of extinguishment of the electrical component of the fire and continuance of the combustible solid fire (e.g., a change from a Class C to Class A fire).

In another example, in some instances, the light emitter 120 can be configured to emit, at a first time, light having a first set of characteristics, including a first intensity. The first intensity can be configured, for example, to represent an incipient stage fire. The light emitter 120 can be configured to emit, at a second time after the first time, light having a second set of characteristics, including a second intensity greater than the first intensity. The second intensity can be configured, for example, to represent a growth stage or fully-developed fire. The light emitter 120 can be configured to emit at a second time light having a third set of characteristics, including a third intensity less than the second intensity, to represent a degree of extinguishment of the fire.

A change in one or more characteristics of the light, movement of the discharged smoke (and thus a change in the redirection of the light thereon), and/or a change in one or more characteristics of the smoke during a simulated fire event can each help to produce the dynamic effect of the simulated fire. Said another way, a change in one of more of the light or the smoke helps to produce the illusion that the simulated flame(s) and/or electric arc(s) are continuously moving or changing, as would a flame or electrical arc in a live fire.

As described herein, characteristics of each of the smoke and the light can be controlled by the controller 130 of the apparatus 100. The controller 130 can be, for example, a logic controller, a logic processor, a programmable logic controller (PLC), a custom printed circuit board (PCB), a general purpose processor, a central processing unit (CPU), an accelerated processing unit (APU), a field-programmable gate array (FPGA), an application specific integrated circuit (ASIC), a digital signal processor (DSP), and/or the like. The controller 130 is disposed within the housing 102. More particularly, the controller 130 can be wholly disposed within the interior volume of the housing 102.

The controller 130 can be configured to control operation of one or more components of the apparatus 100. For example, in some embodiments, the controller 130 is configured to control operation of the smoke generator 110 and/or the light emitter 120.

The controller 130 can be programmed with one or more simulated fire scenarios, including, but not limited to, fire scenarios associated with one, two, three or more classes of fires (e.g., classes A, B and/or C). Said another way, the controller 130 can be configured to execute a program associated with a fire scenario to be simulated such that the controller 130 sends one or more signals to the smoke generator 110 to generate smoke having a predetermined set of characteristics, and/or sends one or more signals to the light emitter 120 to emit light having a predetermined set of characteristics.

The controller 130 can be configured to control the extinguishment difficulty level of the simulated fire. For a predetermined simulated fire scenario, the extinguishment difficulty level of the simulated fire can be predetermined. The extinguishment difficulty level can vary amongst different simulated fire scenarios, or amongst different levels of a predetermined simulated fire scenario, and can range from easy to difficult.

In some implementations, the controller 130 is configured to modulate operation of one or more components of the apparatus 100 during a simulated fire scenario. For example, the controller 130 can be configured to change at least one characteristic of the smoke and/or at least one characteristic of the light based on a pre-programmed fire scenario instruction.

In some implementations, the apparatus 100 can be configured to detect the presence of an extinguishing agent and the controller 130 can be configured to modulate, or change, at least one of the smoke being generated or the light being emitted based on or in response to such detection. For example, the logic controller 130 can be configured to modulate the light and the smoke based on or in response to receipt of an extinguishing agent by a predetermined portion of the housing 102 (e.g., having a sensor). Modulation of the light can include causing the light emitter 120 to change a characteristic of the light or causing the light emitter 120 to cease emitting the light. Modulation of the smoke can include causing the smoke generator to change a characteristic of the smoke or causing the smoke generator to cease generating smoke. For example, the controller 130 can be configured to, in response to feedback from a sensor of the apparatus 100 indicative of detection of the extinguishing agent, reduce the amount of light, change a color of the light, reduce the volume of smoke being generated over a predetermined time (e.g., volume of smoke per second or minute or hour), reduce the density of smoke being generated, or the like, to simulate a degree of extinguishment of the simulated fire.

Also, as described in more detail herein, in some implementations, the apparatus 100, for example, via the controller 130, is configured to be operatively coupled to at least one other fire simulation device and/or a live fire training system. In some implementations, the apparatus 100, and in some implementations, the controller 130 particularly, is configured for wireless communication with at least one of a different fire simulation device, a live fire training system, or a remote controller, as described in more detail herein.

Figure 2:
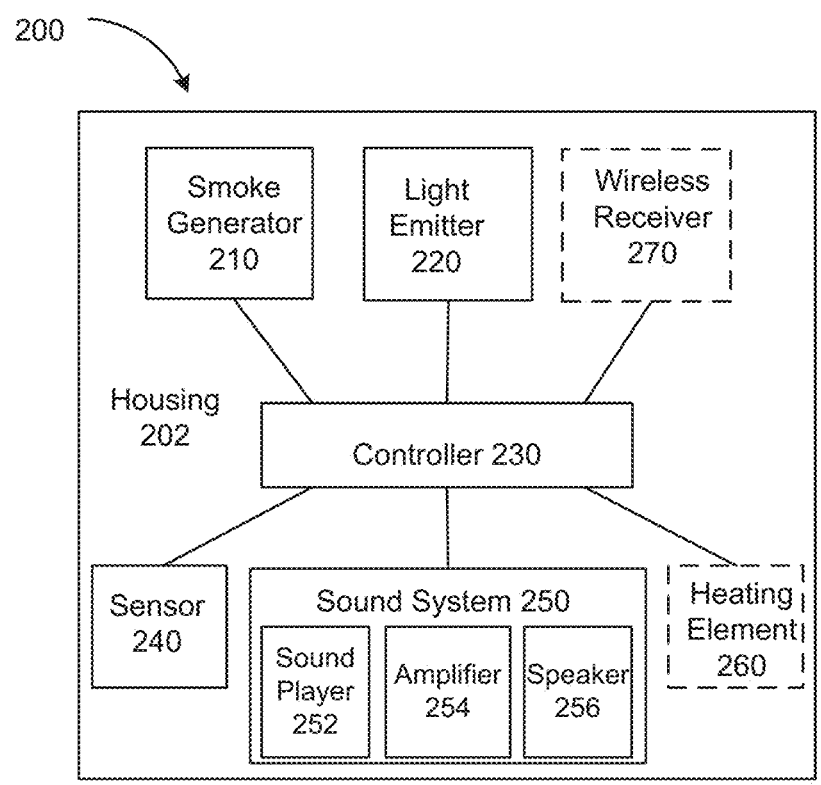
FIG. 2 is a schematic view of a fire simulation apparatus according to an embodiment.

FIG. 2 is a schematic illustration of an apparatus 200 according to an embodiment. The apparatus 200 includes a housing 202, a smoke generator 210, at least one light emitter 220, a controller 230, a sensor 240 and a sound system 250. The apparatus 200 can be similar in many respects to apparatus 100 described herein, and components of the apparatus 200, such as the housing 202, smoke generator 210, at least one light emitter 220, and/or controller 230, can be similar in many respects, or identical to, components of the apparatus 100 (such as the housing 102, smoke generator 110, at least one light emitter 120, and controller 130, respectively).

The housing 202 is configured to at least partially house, and in some embodiments, wholly enclose, other components of the apparatus, such as the smoke generator 210, the light emitter(s) 220, the controller 230, the sensor 240 and the sound system 250, as described herein. The housing 202 includes at least one surface, and can include an upper surface, a lower surface and/or a side surface (e.g., one or more outer wall portions). The housing 202 defines an interior volume, which can be defined, at least in part, by one or more of the upper surface, lower surface or side surface, or a combination thereof.

In some embodiments, a top portion of the housing 202 includes at least the upper surface of the housing, and a bottom portion of the housing 202 includes at least the lower surface of the housing. The housing 202 is configured to be disposed on a support surface, such as a floor, lawn, pavement, other ground surface, furniture, vehicle, equipment, or any elevated surface, one or floors of a structure or building, other suitable support surface. In some embodiments, the housing 202 can be configured to float on a liquid support surface. In some embodiments, the housing 202 is configured to be suspended above a support surface (e.g., by a cord or the like coupled to a retaining element of the housing).

The housing 202 can include a port (not shown in FIG. 2), such as a port similar in many respects or identical to a port described above with respect to housing 102. The port can be configured to permit smoke produced by the smoke generator disposed within the housing to be discharged through to an exterior of the housing. In some implementations, the port is located or positioned with respect to the surface of the housing 202 such that at least a portion of the discharged smoke is positioned vertically with respect to the housing 202. For example, the port can be included in or defined by a top portion of the housing 202 such that at least a portion of the discharged smoke is positioned vertically above (e.g., directly overhead of) the housing 202. In some implementations, the port is included in or defined by a bottom portion of the housing 202 such that at least a portion of the discharged smoke is positioned vertically below (e.g., directly beneath) the housing 202. In some implementations, the port is disposed on or defined by the housing such that at least a portion of the discharged smoke is positioned with respect to the housing on a side (e.g., above, below, or beside) of the housing opposite the support surface. In some implementations, the port has a central axis and the smoke is configured to be discharged via the port in a direction parallel to and/or aligned with the central axis of the port. In some embodiments, the housing 202 includes a port or other suitable opening by which the housing is configured to receive at least a portion of an extinguishing agent.

The housing 202 can be impervious (e.g., waterproof) or liquid-resistant, so that the housing 202 is configured to protect components therein from coming into contact with, and possibly being damaged by, a liquid extinguishing agent (e.g., water, foam, or the like). More specifically, in some embodiments, at least a portion of the housing 202 is impervious or resistant to fluid (and, optionally, gas) such that the housing is configured to prevent or resist the fluid (or gas) from contacting internal components of at least one of the light emitters, the smoke generator, or the controller. In some embodiments, the housing 202 is impervious or liquid-resistant, except for a port defined by the housing (e.g., the port configured to receive at least a portion of the extinguishing agent or the port configured to discharge smoke from the housing). The housing 202, for example, can be constructed of any suitable material, such as a material described herein with respect to housing 102.

In some implementations, the housing 202 includes at least one door configured to provide access to the interior volume and/or a component of the apparatus 200 at least partially disposed within the interior volume. The housing 202 can include a seal, flange, or the like disposed about the perimeter of the door to help prevent or resist liquid (or gas) from passing therethrough to the interior volume when the door is in a closed position. The housing 202 can include one or more leg members configured to be disposed on a support surface and optionally configured to space the housing 202 away from the support surface by a predetermined distance such that the housing 202 is spaced apart from a volume of extinguishing agent that may accumulate on the support surface. The housing 202 can have any suitable size characteristic (height, width, or the like) or weight, such as that described herein with respect to housing 102.

The smoke generator 210 of the apparatus 200 is at least partially, or completely, disposed within the interior volume of the housing 202. The smoke generator 210 is configured to generate smoke. The smoke generator 210 can include or be similar to a theatrical smoke machine or fog machine. The smoke generator 210 can be an electro-mechanical unit that can include a heating element (not shown in FIG. 2), electronic circuitry, and optionally a pump (not shown in FIG. 2). The electronic circuitry is operatively coupled to the heating element to maintain the heating element within a predetermined range of temperatures, when the smoke generator 210 is in use. In use, the smoke fluid is moved (e.g., via the pump, pressure, gravity, or the like) through the heating element such that the fluid is vaporized to form smoke vapor. The smoke fluid can be a water-based fluid, such as glycol and water, or an oil-based fluid. In some embodiments, the smoke generator 210 can include a fan configured to help discharge the smoke (or smoke vapor) from the apparatus 200.

In some implementations, the smoke generator 210 is configured to selectively generate smoke. For example, the smoke generator 210 can be configured to generate smoke in response to a command or signal received from the controller 230. The smoke generator 210 can be configured to generate smoke having one or more predetermined characteristics, such as volume, density, or other suitable characteristic, for example, based on the command or signal received from the controller 230. The smoke is configured to redirect light emitted thereon such that the smoke can visually appear to glow, thereby simulating the appearance of a flame or electrical arc.

The smoke generator 210 can be configured for variable output of smoke. In some instances, the smoke generator 210 is configured to generate at a first time a first volume of smoke having a first set of characteristics and to generate at a second time, later than the first time, a second volume of smoke having a second set of characteristics. The first set of characteristics can be associated with, for example, a first class (or combination of classes) of fire, a first intensity of fire, a first stage of fire, or the like, and the second set of characteristics can be associated with, for example, a second class of fire, a second intensity of fire, a second stage of fire, or the like. In this manner, the smoke generator 210 can facilitate simulation of fire at different stages, such as a small fire (e.g., an incipient stage fire), a medium fire (e.g., a growth stage fire), a large fire (e.g., fully developed stage fire) or a decaying fire or a fire close to being extinguished. Also in this manner, the smoke generator 202 can facilitate simulation of extinguishment of a fire, by producing a greater volume and/or more dense smoke at the first time and a lesser volume and/or less dense smoke at the second time. In some instances, the smoke generator 210 is configured to transition from generation of the first volume of smoke to generation of the second volume of smoke without an interruption in smoke generation.

The smoke generator 210 can be configured to discharge at least a portion of the smoke, such as via one, two, or more ports of the housing 202. In this manner, the apparatus 200 is configured to discharge at least a portion of the smoke such that the portion of the smoke is vertically disposed with respect to the housing 202, as described herein.

The smoke generator can be configured to generate smoke using, for example theatrical smoke fluid (e.g., a mixture of water and propylene glycol). In some embodiments, the apparatus 200 includes a reservoir (e.g., disposed within the interior volume of the housing 202) (not shown in FIG. 2) that is configured to contain a volume of the smoke fluid and to permit the smoke fluid to be conveyed to the smoke generator.

The light emitter 220 is configured to emit light, to facilitate simulation of a dynamic representation of a fire, as described herein. The light emitter 220 is coupled to the housing 202. In some arrangements, the light emitter 220 can be disposed on or coupled directly to the surface of the housing 202. In some arrangements, the light emitter 220 can be at least partially disposed in the interior volume of the housing 202. In some arrangements, the light emitter 220 includes a light emitting diode ("LED"), or multiple LEDs. In some arrangements, the light emitter can include one or more of a LED, a strobe light, a laser, an incandescent light bulb, a halogen lamp, a fluorescent light, fiber optics, or a combination thereof.

The light emitter 220 can include one or more light emitters, which can be arranged in any suitable configuration with respect to the housing 202. For example, the light emitters 220 can be arranged in a pattern (e.g., on the surface of the housing 202), for example, in two or more parallel rows, in two or more staggered parallel rows, in concentric circles, or in a circular, ellipsoidal, rectangular, square, diamond, star or other desired shaped pattern.

The light emitter 220 can be configured to emit light towards a volume of space adjoining the housing 202. For example, in some embodiments, the light emitter 220 is configured to emit light in a direction parallel to, or the same as, the direction in which smoke is discharged from the housing 202. In another example, the light emitter 220 is configured to emit light towards a volume of space adjoining the housing, such as in a vertical direction with respect to the housing 202 (e.g., overhead or beneath). More particularly, the light emitter 220 can be configured to emit light towards at least a portion of the smoke discharged from the housing 202. In some instances, the light emitter 220 is configured to emit the light such that the light is transmitted a non-zero distance beyond the surface of the housing 202, for example up to five feet, up to ten feet, up to fifteen feet, or up to twenty feet beyond the surface of the housing 202.

The light is configured to be redirected by at least a portion of the discharged smoke, which can cause the portion of smoke to visually appear as though it is glowing or illuminated. In this manner, the light emitted by the light emitter 220 and the portion of smoke are collectively configured to simulate a flame or electric arc above the surface of the housing.

The light emitted by the light emitter 220 and at least the portion of discharged smoke are collectively configured to simulate the flame or electric arc above the surface of the housing 202 such that the simulated flame or electric arc is viewable from more than 180 degrees about the surface of the housing 202. Said another way, the light and discharged smoke are collectively configured to produce a dynamic representation of a fire that is viewable from more than 180 degrees about a vertical axis or centerline of at least one of the apparatus 200, the emitted light, or the surface of the housing 202. In some implementations, the dynamic representation of the fire (or the simulated flame or electric arc) is viewable from an angle within the range of more than 180 degrees up to 360 degrees (e.g., more than about 190 degrees, more than about 220 degrees, more than about 235 degrees, more than about 270 degrees, more than about 315 degrees. For example, in some implementations, the dynamic representation of the fire (or the simulated flame or electric arc) is viewable from an angle within the range of 270 degrees to 360 degrees about the surface of the housing. In another example, in some implementations, the dynamic representation of the fire (or the simulated flame or electric arc) is viewable from about 360 degrees about the surface of the apparatus 200.

The light emitter 220 can be configured to selectively emit light having a predetermined set of characteristics. The light characteristics can include, but are not limited to, wavelength, intensity, color, pattern of emission (e.g., continuous, pulsing, intermittent or the like), duration of emission, or the like. The characteristic(s) of the light can be determined, for example, based on one or more signals received by the light emitter 220 from the controller 230. In some embodiments, a predetermined program can be used to control the characteristics of the light.

The light emitter 220 can be configured to emit light in any suitable color, including red, amber, white and blue. In some implementations, the light emitter 220 can be configured to emit multicolored light. For example, the light emitter 220 can be configured to emit light having at least two different colors, including at least two of red, amber, white and blue.

The light color, or combination of colors, is configured to produce a simulated representation of a flame or electrical arc when the light is redirected (e.g., by smoke). For example, the light emitter 220 can be configured to substantially concurrently emit red and amber colored light to produce a representation of a flame. In another example, the light emitter 220 can be configured to substantially concurrently emit red, amber, blue and white colored light to produce a representation of a flame or flames having greater intensity or heat than a flame simulated with only red and amber lights. In yet another example, the light emitter 220 can be configured to substantially concurrently emit blue and white colored light to produce a representation of an electrical arc.

The color of the light can be selectively emitted based on a signal received from the controller 230. The color of the light can be modulated during use of the apparatus 200 based on a signal received from the controller 230. For example, the controller 230 can send a signal to the light emitter 220 to change the color of the light or combination of colors of the light during use.

In some implementations, the light emitter 220 can be configured to change, during use, the light emitted, such as based on the predetermined program and/or based on a signal received (e.g., during use) from the controller 230. Said another way, the light emitter 220 can be configured to emit at a first time (or during a first time period) light having a first set of characteristics and to emit light at a second time (or during a second time period), after the first time light having a second set of characteristics different from the first set of characteristics. In this manner, the characteristics of the light being emitted by the light emitter 220 can be changed over time, which can be used to help simulate a fire that increases or decreases in intensity over time, to help simulate a resurgence of a fire, to help simulate a change in class of fire (e.g., from Class C to Class A) during a fire training scenario.

For example, in some embodiments, the light emitter 220 can be configured to emit, at a first time, light having a first set of characteristics, including blue and white colored light representative of an electrical fire. The light emitter 220 can be configured to emit, at a second time, light having a second set of characteristics, including blue, white, red and amber colored light representative of an electrical fire that also includes combusted solids. The light emitter 220 can be configured to emit at a third time, light having a third set of characteristics, including red and amber colored light, but no blue and white light, representative of extinguishment of the electrical component of the fire and continuance of the combustible solid fire (e.g., a change from a Class C to Class A fire).

In another example, in some embodiments, the light emitter 220 can be configured to emit, at a first time, light having a first set of characteristics, including a first intensity. The first intensity can be configured, for example, to represent an incipient stage fire. The light emitter 220 can be configured to emit, at a second time after the first time, light having a second set of characteristics, including a second intensity greater than the first intensity. The second intensity can be configured, for example, to represent a growth stage or fully developed fire. The light emitter 220 can be configured to emit at a second time light having a third set of characteristics, including a third intensity less than the second intensity, to represent a degree of extinguishment of the fire.

A change in one or more characteristics of the light, movement of the discharged smoke (and thus a change in the redirection of the light thereon), and/or a change in one or more characteristics of the smoke during a simulated fire event can each help to produce the dynamic effect of the simulated fire. Said another way, a change in one of more of the light or the smoke helps to produce the illusion that the simulated flame(s) and/or electric arc(s) are continuously moving or changing, as would a flame or electrical arc in a live fire.

The sound system 250 of the apparatus 200 is configured to enhance the realism of the fire simulation scenario, by providing a sound component to the training environment that includes at least one or more sounds that may be heard during a live fire event, which sounds firefighters are often trained to listen for during a search and rescue operation. For example, in some embodiments, the sound system 250 is configured to output at least one sound associated with at least one class of fire. For example, the sound system 250 can be configured to output from the apparatus 200 a sound associated with a Class A fire or a Class B fire, such as a crackling, popping, or hissing sound. In another example, the sound system 250 can be configured to output from the apparatus 200 a sound associated with a Class C fire, such as an electrical arcing sound. In still another example, the sound system 250 can be configured to output a sound associated with the environment in which the fire scenario is simulated to occur. Such sounds may include one or more of a crying baby, child, or person, a person screaming, a barking dog, a meowing cat, a sound of a structure falling or collapsing, or the like, or any combination thereof.

The sound system 250 can include, for example, a sound player 252, an audio amplifier 254 and a speaker 256. The sound system 250 is mechanically coupled to the housing 202. In some implementations, at least a portion of the sound system 250 is disposed within the interior volume of the housing 202. In some implementations, at least a portion of the sound system 250 is coupled to the surface of the housing 202. For example, in some implementations, the digital sound player 252 and the audio amplifier 254 are disposed within the interior volume of the housing 202 and the speaker 256 is partially disposed within the housing 202 and partially disposed on the surface of the housing 202. In some implementations, the speaker 256 is directly coupled to the bottom portion of the housing 202, and thus one or more of the leg members can be included in the housing 202 to space the bottom portion of the housing 202 apart from the support surface to better permit sound to be transmitted from the speaker to the environment around the apparatus 200. In another example, each component of the sound system 250 is disposed within the interior volume of the housing 202, and the housing 202 is configured with an opening through which sound from the speaker 256 can be transmitted to outside of the housing. The speaker 256 can be impervious (e.g., waterproof) or liquid (e.g., water) resistant.

In some implementations, the sound player 252 is a digital sound player. The sound(s) can be included in at least one audio recording stored in the sound player 252. In some instances, the sound player 252 includes two or more audio recordings, each with a different sound or combination of sounds. In use, the sound player 252 can be configured to selectively output at least one audio recording from the two or more audio recordings.

In some implementations, the sound player is a multi-channel digital sound player. In this manner, the sound player 252 can be configured to play one or multiple audio recordings (or sound file portions) during a predetermined time period. For example, the sound player 252 can be configured to play a first audio recording that includes at least one sound associated with a fire and substantially concurrently play a second audio recording that includes at least one sound associated with a person or animal.

The sound system 250 is configured to output the one or more sounds at a volume for the sound(s) to be heard by a person participating in the fire training scenario without the assistance of a hearing device, and at a predetermined distance from the apparatus 200. For example, the sound system 250 can be configured to output a sound(s) at a volume that permits the sound to be heard outside of a closed room or from a distance within the range of about 25 feet to about 200 feet from the apparatus 200.

The sound system 250 can be configured to produce (output) a sound based on or in response to a signal received from the controller 230. In some embodiments, the sound system 250 can be selectively controlled by the controller 230, as described in more detail herein. As such, the timing of output of the sound(s) can be coordinated by the controller (or via a program) with smoke generation and light emission, to produce collectively a desired or predetermined fire simulation scenario. Said another way, the sound system 250 can be configured to output an audible representation of a fire during a time period that the smoke generator 210 and light emitter 220 collectively output a dynamic visual representation of the fire. In this manner, the apparatus 200 is configured to substantially simultaneously output a dynamic visual and audible representation of the fire.

The apparatus 200 can optionally include a heating element 260, indicated by dashed lines in FIG. 2. The heating element 260 is configured to permit the simulator to be seen or viewed via a thermal imaging camera, including in a dark, smoky environment. The heating element 260 can include a wire, coil, straight ribbon, corrugated ribbon, or strip of a suitable material that emits heat when power is supplied therethrough. For example, the heating element 260 can include a metal or metal alloy, such as steel (e.g., stainless steel), iron, nickel (e.g., nickel-chromium), copper, titanium, or the like, and/or a ceramic material. When an electrical current (from a power source, such as a battery, power pack, AC or DC power, or the like) is passed through the heating element, the metal or metal alloy, e.g., nickel-chromium, material converts the electrical energy to heat that can radiate from the heating element in multiple directions.

The heating element 260 can be at least partially, or wholly, disposed within the housing 202, or can be at least partially, or wholly, disposed on a surface of the housing 202. The heating element 260 can be configured to be in electrical communication with a power source, such as via electronic circuitry coupled to and/or disposed within the housing. The heating element 260, in some embodiments, is distinct from (e.g., is a separate component than) the smoke generator 210 and/or the one or more light emitters 220. The heating element 260 is configured to generate an amount of heat (e.g., a "hot spot") representative of at least one of a fire or a body (e.g., a living body, such as a person or animal). In this manner, the apparatus 200 is configured to facilitate fire fighter training that includes the use of thermal imaging equipment for search and rescue operations.

The heating element 260 can be thermostatically controllable. In some embodiments, the heating element 260 is configured to be controlled or modulated by the controller 230. For example, the apparatus 200 can include a thermostat, such as a mechanical thermostat or processor-based temperature controls (including, but not limited to a remote temperature probe, a temperature alarm, or the like). The thermostat (or temperature controller) can be integrated with the controller 230, or can be in electrical communication with the controller 230. In this manner, in some embodiments, the heating element 260 can be configured to generate the amount of heat in response to a signal from the controller 230, to change (increase or decrease) the amount of heat being generated by the heating element 260 in response to a signal from the controller 230 and/or cease generating heat in response to a signal from the controller 230. In some instances, the controller 230 is configured to cause the heating element 260 to generate the amount of heat during a time period that is prior to, concurrent with, or subsequent to a time period during which the smoke generator 210 and one or more light emitters 220 collectively output a dynamic visual representation of a fire.

The sensor 240 is coupled to the housing 202. In some embodiments, the sensor 240 is disposed within the interior volume of the housing 202. More specifically, in some embodiments, the sensor can be disposed within the bottom portion of the housing 202. The housing 202 can be configured to receive and/or collect, at least temporarily, an amount of extinguishing agent applied to the housing 202, such as during a fire training scenario.

For example, in some embodiments, the top portion of the housing 202 includes the port or opening through which the housing 202 can receive the extinguishing agent. The housing 202 can include a lumen (not shown in FIG. 2) (e.g., a drain line or channel) extended from the port or opening to a bottom portion of the housing 202 (e.g., to an exit port or drain opening defined by or coupled to the bottom portion of the housing 202, or at least a location of the housing 202 lower than the sensor 240). The lumen is configured to permit the extinguishing agent received via the opening or port of the top portion of the housing 202 to flow or otherwise move towards the exit port. The sensor 240 can be positioned within the housing 202 adjacent to the lumen or inline with the lumen.

The sensor 240 is configured to detect an extinguishing agent. In some embodiments, the sensor 240 is configured to detect a liquid extinguishing agent, such as water or foam. In some embodiments, the sensor 240 is configured to detect a dry extinguishing agent, such as a powder or carbon dioxide ($CO_2$). The sensor 240 can be configured to detect two or more types of extinguishing agents (e.g., to detect both a liquid agent and a dry agent), or a combination thereof. In another example, the sensor 240 can be configured to detect the presence or passage of the extinguishing agent within the lumen. In some implementations, the sensor 240 is configured to detect a predetermined amount of the extinguishing agent. For example, in some implementations, the sensor 240 is configured to detect a first predetermined amount of the extinguishing agent (e.g., at a first time), and a second predetermined amount of the extinguishing agent (e.g., at a second time different from the first time). The sensor 240 can be configured to send a signal to the controller 230 based on or in response to the detection of the predetermined amount (e.g., the first predetermined amount and/or the second predetermined amount) of the extinguishing agent. In some implementations, the sensor 240 can be configured to detect that a predetermined amount of the extinguishing agent has moved within the lumen of the housing 202 (e.g., past or through the sensor). In some implementations, the sensor 240 is configured to detect a duration during which the extinguishing agent is present in the housing 202 and/or moves through the lumen of the housing 202.

As described herein, characteristics of each of the smoke, light, sound and heat generated or otherwise produced or output by a component of the apparatus 200 can be controlled by the controller 230 of the apparatus 200. The controller 230 can be, for example, a logic controller, a logic processor, a programmable logic controller (PLC), a custom printed circuit board, or the like. The controller 230 is disposed within the housing 202. More particularly, the controller 230 can be wholly disposed within the interior volume of the housing 202.

The controller 230 can be configured to control operation of one or more components of the apparatus 200. For example, in some embodiments, the controller 230 is configured to control operation of the smoke generator 210, the light emitter(s) 220, the sensor 240, the sound system 250, and/or the heating element 260.

The controller can be programmed with one or more simulated fire scenarios, including, but not limited to, fire scenarios associated with one, two, three or more classes of fires (e.g., classes A, B and/or C). Said another way, the controller 230 can be configured to execute a program associated with a fire scenario to be simulated such that the controller 230 selectively sends one or more signals to the smoke generator 210 to generate smoke having a predetermined set of characteristics, sends one or more signals to the light emitter 220 to emit light having a predetermined set of characteristics, sends one or more signals to the sound system 250 to output at least one audio recording, and/or sends one or more signals to the heating element 260 to generate heat within a predetermined temperature range (e.g., within the range of about 200 degrees Fahrenheit to about 1000 degrees Fahrenheit, or about 200 degrees Fahrenheit). In other words, controller 230 can send a signal(s) to various components of apparatus 200 to cause or trigger those components to generate an output based on or in response to the signal(s).

The controller 230 can be configured to control the extinguishment difficulty level of the simulated fire. For a predetermined simulated fire scenario, the extinguishment difficulty level of the simulated fire can be predetermined. The extinguishment difficulty level can vary amongst different simulated fire scenarios, or amongst different levels of a predetermined simulated fire scenario, and can range from easy to difficult. For example, in some instances, the controller 230 can determine a threshold amount of an extinguishing agent and can be configured to send a signal to the sensor 240 indicative of the threshold amount of extinguishing agent to be detected by the sensor. An easy extinguishment-difficulty-level for a simulated fire scenario can be associated with a low threshold amount being determined by the controller 230. Similarly, a difficult extinguishment-difficulty-level for a simulated fire scenario can be associated with a high threshold amount being determined by the controller 230.

In some embodiments, the controller 230 is configured to modulate operation of one or more components of the apparatus 200 during a simulated fire scenario. For example, the controller 230 can be configured to change at least one characteristic of the smoke, at least one characteristic of the light, at least one characteristic of the heat (e.g., temperature), and/or at least one characteristic of the sound (e.g., volume, or audio recording selection) based on a pre-programmed fire scenario instruction.

In some embodiments, the controller 230 can be configured to modulate, or change, at least one of the smoke being generated, the light being emitted, the heat being generated, or the sound being output, based on or in response to detection by the sensor 240 of the first predetermined amount of the extinguishing agent. For example, the logic controller 230 can be configured to modulate the light, the smoke, the heat, or the sound based on or in response to receipt of a first predetermined amount of the extinguishing agent by a predetermined portion of the housing 202 (e.g., the lumen). Modulation of the light can include causing the light emitter 220 to change a characteristic of the light or to cease emitting the light. Modulation of the smoke can include causing the smoke generator to change a characteristic of the smoke or to cease generating smoke. Modulation of the sound can include causing the sound system 250 to change the volume at which the audio recording or sound is output and/or can including causing the sound system 250 to output a different or additional audio recording. Modulation of the heat can include causing the heating element 260 to generate heating having a different temperature or a temperature within a different range of temperatures.

For example, the controller 230 can be configured to, in response to a signal from the sensor 240 based on or in response to detection of the predetermined amount (e.g., a first amount) of the extinguishing agent, reduce the amount of light, change a color of the light, reduce the volume of smoke being generated over a predetermined time (e.g., volume of smoke per second or minute or hour), reduce the density of smoke being generated, decrease a volume of the audio recording output, cease outputting the audio recording, reduce the temperature of the heat generated by the heating element 260, or the like, or any suitable combination of the foregoing, to simulate a degree of extinguishment of the simulated fire. In another example, the controller 230 can be configured to, in response to a signal (e.g., a second or subsequent signal) from the sensor 240 based on or in response to detection of the second predetermined amount of the extinguishing agent, cease emission of or reduce the amount of light, change a color of the light, cease smoke generation, reduce the volume of smoke being generated over a predetermined time (e.g., volume of smoke per second or minute or hour), reduce the density of smoke being generated, cease output of the audio recording, decrease the volume of the audio recording output, cease heat generation by the heating element 260, or the like, or any suitable combination of the foregoing, to simulate a further degree of extinguishment or total extinguishment of the simulated fire.

Also, as described in more detail herein, in some embodiments, the apparatus 200, for example, via the controller 230, is configured to be operatively coupled to at least one other fire simulation device and/or a live fire training system.

In some embodiments, the apparatus 200, and in some implementations, the controller 230 particularly, is configured for wireless communication with at least one of a different fire simulation device(s), a live fire training system(s), or a remote controller(s). For example, the apparatus 200 can optionally include a wireless receiver 270 (shown in dashed lines in FIG. 2) coupled to the housing and in operative communication with the controller 230. The controller 230 is configured to receive a signal from a remote controller via the wireless receiver. The signal from the remote controller can be configured to cause the controller 230 to modulate operation of at least one of the light emitter 220 or the smoke generator 210. The remote controller can be, for example, another fire simulation apparatus. In another example, the remote controller can be a live fire training system or unit, or a controller thereof. In still another example, the remote controller can be, for example, a personal computer (PC), a personal digital assistant (PDA), a smart phone, a laptop, a tablet PC, a server device, a workstation, a different fire simulator, or the like. In some embodiments, the remote controller allows for remote operation of the apparatus 200 so that an instructor, for example, can initiate or change a simulated fire or fire condition remotely to present an element of surprise to a firefighting trainee who may be close to the apparatus at the time it is remotely controlled.

Figure 3:
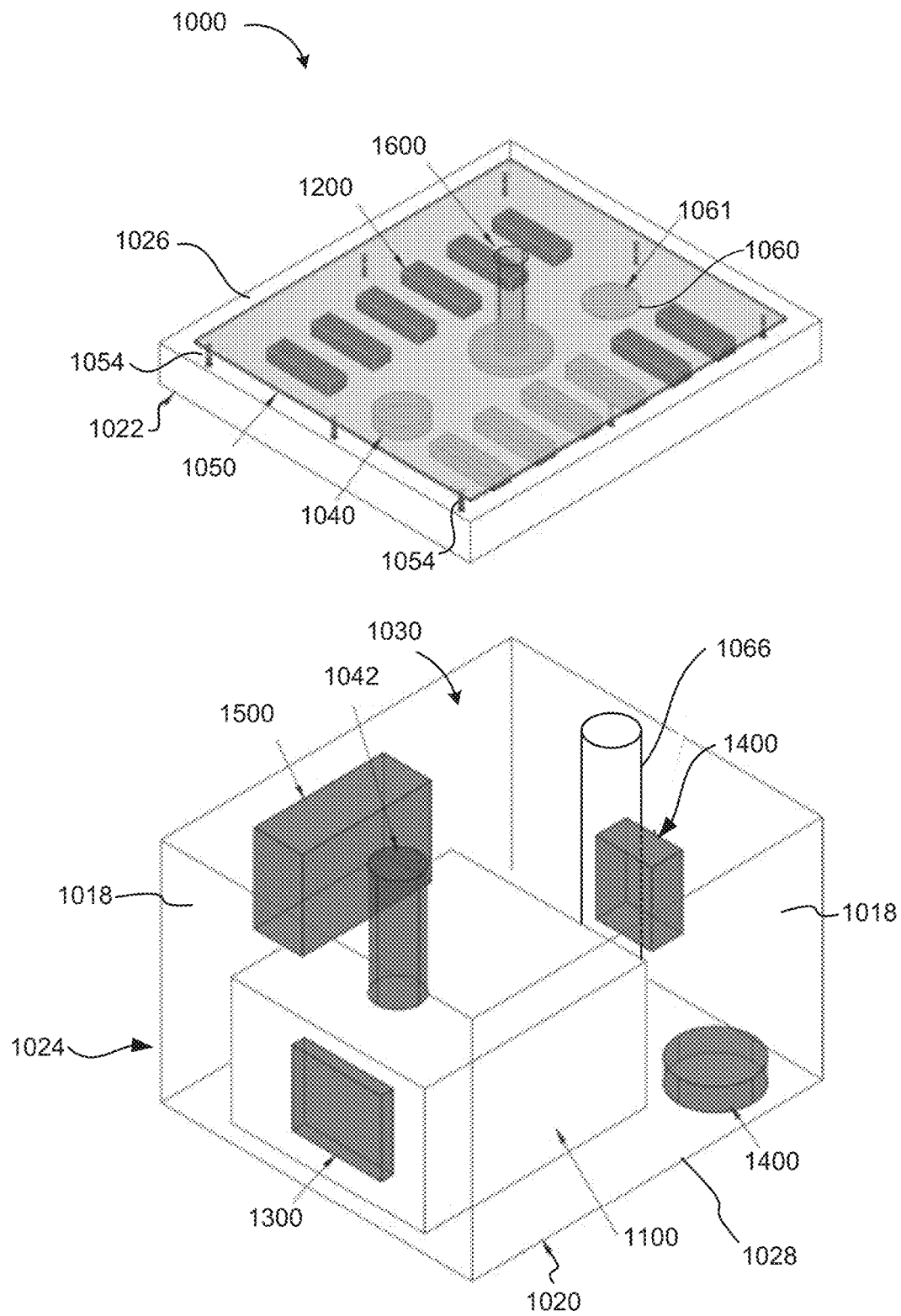
FIG. 3 is a partially exploded perspective view of a fire simulation apparatus according to an embodiment.

FIG. 3 is a partially exploded perspective view of an apparatus 1000 according to an embodiment. The apparatus 1000 is configured to produce a fire training scenario, or portion thereof. In particular, for example, the apparatus 1000 is configured to output a dynamic visual and audible representation of a fire. The apparatus 1000 can be similar in many respects to apparatus 100, 200 described herein, and components of the apparatus 1000, such as a housing 1020, smoke generator 1100, light emitters 1200, controller 1300, sensor 1400, sound system 1500, and/or heating element 1600 can be similar in many respects, or identical to, components of the apparatus 100, 200 (such as the housing 102, 202, smoke generator 110, 210, at least one light emitter 120, 220, controller 130, 230, sensor 240, sound system 250, and/or heating element 260, respectively). The apparatus 1000 can include electronic circuitry (not shown in FIG. 3) configured to electrically couple the smoke generator 1100, light emitters 1200, controller 1300, sensor 1400, sound system 1500, and/or heating element 1600.

The apparatus 1000 includes a housing 1020 having a top portion 1022 (e.g., a removable lid) and a bottom portion 1024. The top portion 1022 and bottom portion 1024 of the housing 1020 collectively define an interior volume 1030. The top portion 1022 includes a top or upper surface 1026. The bottom portion 1024 includes a bottom or lower surface 1028. The housing includes four side walls 1018 extended between the upper surface 1026 and the lower surface 1028, to form a generally square or rectangular shaped housing 1020. Although the housing 1020 is shown as being substantially square or rectangular, in other embodiments, the housing 1020 can have any suitable shape (e.g., cylindrical, conical, pyramid, or other suitable shape). The housing 1020 can include a seal, flange, or the like disposed between overlapping portions of the top portion 1022 of the housing and the bottom portion 1024 of the housing when the top portion 1022 is coupled to the bottom portion 1024. The seal or the like is configured to help prevent liquid (e.g., in some embodiments, including the extinguishing agent) from passing therethrough to the interior volume 1030.

The housing 1020 is configured to be disposed on a support surface, such as a floor, lawn, pavement, other ground surface, furniture, vehicle, equipment, or any other suitable support surface. For example, the housing 1020 can include a substantially planar or flat lower surface 1028 such that the housing 1020 can be stably disposed on the support surface.

The housing 1020 can be impervious (e.g., waterproof) or liquid-resistant, so that the housing 1020 is configured to protect components therein from coming into contact with, and possibly being damaged by, a liquid extinguishing agent (e.g., water, foam, or the like). More specifically, in some embodiments, at least a portion of the housing 1020 is impervious or resistant to fluid (and, optionally, gas) such that the housing is configured to prevent the fluid (or gas) from contacting internal components of at least one of the light emitters, the smoke generator, or the controller. In some embodiments, the housing 1020 is impervious or liquid-resistant, except for a port defined by the housing (e.g., the port configured to receive at least a portion of the extinguishing agent or the port configured to discharge smoke from the housing). The housing 1020, for example, can be constructed of any suitable material, such as a material described herein with respect to housing 102.

The housing 1020 is configured to at least partially house, and in some embodiments, wholly enclose, other components of the apparatus, such as the smoke generator 1100, the light emitter(s) 1200, the controller 1300, the sensor 1400, the sound system 1500, and/or the heating element 1600. Although various components of the apparatus 1000 are shown in FIG. 3 as being disposed in the housing 1020 in a certain location, position or orientation, such components can be disposed in the housing in any number of suitable configurations.

The smoke generator 1100 of the apparatus 1000 is disposed within the interior volume 1030 of the housing 1020. The smoke generator 1100 can be similar or identical to any smoke generator described herein (e.g., smoke generator 110, 210), and can include similar or identical components of any smoke generator described herein. The smoke generator 1100 is configured to generate smoke. More particularly, the smoke generator 1100 is configured to selectively generate smoke, for example, in response to a command or signal received from the controller 1300. The smoke generator 1100 can be configured to generate smoke having one or more predetermined characteristics including, but not limited to, volume, density, or other suitable characteristic that can be based, for example, on the command or signal received by the smoke generator 1100 from the controller 1300. The smoke is configured to redirect light emitted thereon such that the smoke can visually appear to glow, thereby simulating the appearance of a flame or electrical arc.

The smoke generator 1100 can be configured for variable output of smoke. In some embodiments, the smoke generator 1100 is configured to generate at a first time a first volume of smoke having a first set of characteristics and to generate at a second time, later than the first time, a second volume of smoke having a second set of characteristics. The first set of characteristics can be associated with, for example, a first class of fire, a first intensity of fire, a first stage of fire, or the like, and the second set of characteristics can be associated with, for example, a second class of fire, a second intensity of fire, a second stage of fire, or the like. In this manner, the smoke generator 1100 can facilitate simulation of fire at different stages, such as a small fire (e.g., an incipient stage fire), a medium fire (e.g., a growth stage fire), a large fire (e.g., fully-developed-stage fire) or a decaying fire or a fire close to being extinguished. Also in this manner, the smoke generator 1100 can facilitate simulation of extinguishment of a fire, by producing a greater volume and/or more dense smoke at the first time and a lesser volume and/or less dense smoke at the second time. The smoke generator 1100 can be configured change one or more characteristics of the smoke without interruption in the generation of the smoke.

The smoke generator 1100 can be configured to generate smoke using, for example theatrical smoke fluid (e.g., a mixture of water and propylene glycol). In some embodiments, the apparatus 1000 includes a reservoir (e.g., disposed within the interior volume 1030 of the housing 1020) (not shown in FIG. 3) that is configured to contain a volume of the smoke fluid and to permit the smoke fluid to be conveyed to the smoke generator 1100.

The smoke generator 1100 can be configured to discharge at least a portion of the smoke, such as via one, two, or more ports of the housing. For example, as shown in FIG. 3, the housing 1020 includes a port 1040 configured to permit smoke produced by the smoke generator 1100 disposed in the interior volume 1030 of the housing 1020 to be discharged therethrough to an exterior of the housing 1020. The port 1040 is defined by or located on the upper surface 1026 of the housing 1020 such that at least a portion of the smoke, when discharged, is positioned vertically above (e.g., directly overhead of) with respect to the housing 1020. The port 1040 has a central axis and the smoke is configured to be discharged via the port in a direction parallel to and/or aligned with the central axis of the port. A tube 1042 is an elongate member having a lumen and is extended between the port 1040 and the smoke generator 1100. The tube 1042 fluidically couples the smoke generator 1100 and the port 1040 such that smoke generated by the smoke generator 1100, as described herein, can be discharged via the port 1040 to outside of the housing 1020.

The housing 1020 includes a diffuser 1050 coupled to the upper surface 1026 of the top portion 1022 of the housing 1020. As shown, the diffuser 1050 is a transparent or semi-transparent diffuser plate that is coupled to the upper surface 1026 of the housing 1020 by posts 1054 (with eight posts shown in FIG. 3, although any suitable number of posts can be included). The posts 1054 are configured to couple the diffuser 1050 to the surface of the housing 1020 such that the diffuser is spaced apart (by a non-zero distance) from the surface of the top portion 1022 of the housing 1020. The posts 1054 are also configured to couple the diffuser 1050 to the surface of the housing 1020 such that the diffuser is disposed over and spaced apart from the port 1040, as shown in FIG. 3. The diffuser 1050 is configured to change a direction of movement of at least a portion of smoke discharged from the apparatus 1000. In this manner, the diffuser 1050 is configured to widen the distribution of the portion of the discharged smoke, and thereby widen a base portion of a simulated fire (or simulated flame or electric arc).

The apparatus 1000 includes one or more light emitters 1200 configured to emit light to facilitate simulation of a dynamic representation of a fire, as described herein. The light emitters 1200 are coupled to the housing 1020. For example, as shown in FIG. 3, the light emitters 1200 are disposed on and coupled to the upper surface 1026 of the housing 1020. The light emitters 1200 are positioned with respect to the housing 1020 between the upper surface 1026 of the housing and the diffuser 1050. Because the diffuser 1050 is transparent or semi-transparent, light emitted by the light emitters 1200 can be transmitted through the diffuser 1050. The diffuser can be constructed of any suitable material including, for example, glass, acrylic, (e.g., Plexiglas®, Lexan®), polycarbonate, plastic, or other suitable material or combination of the foregoing.

The light emitters 1200 can include one or more of a LED, a strobe light, a laser, an incandescent light bulb, a halogen lamp, a fluorescent light, fiber optics, or a combination thereof. Also, the light emitters 1200 can be arranged in any suitable configuration with respect to the housing. For example, as shown in FIG. 3, the light emitters 1200 are LEDs arranged in two substantially parallel rows. In other arrangements, however, the light emitters 1200 can be arranged in a different pattern, for example, in a single row, in three or more parallel rows, in two or more staggered parallel rows, in concentric circles, or in a circular, ellipsoidal, rectangular, square, diamond, star or other desired shaped pattern.

Figure 4:
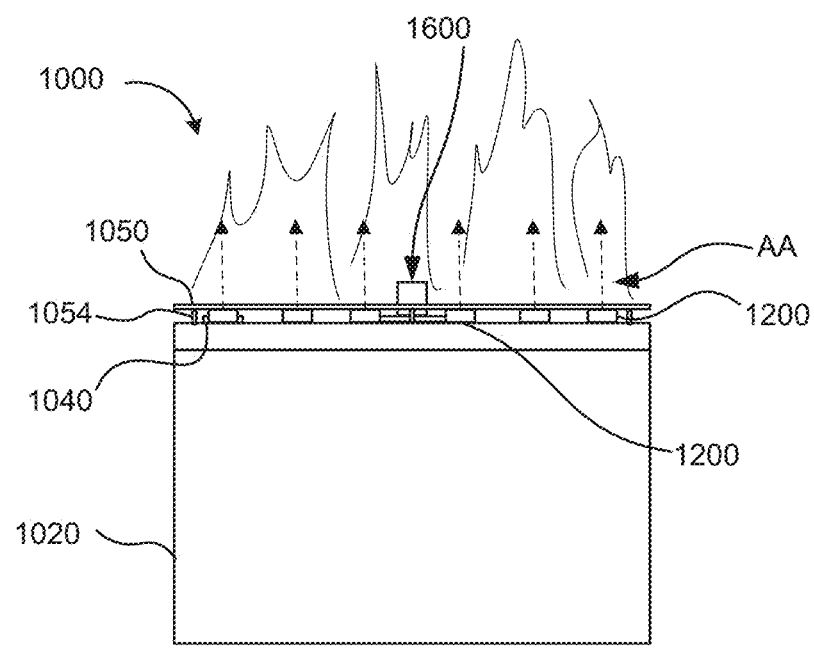
FIG. 4 is a front view of the fire simulation apparatus of FIG. 3 outputting a dynamic representation of a fire.
Figure 5:
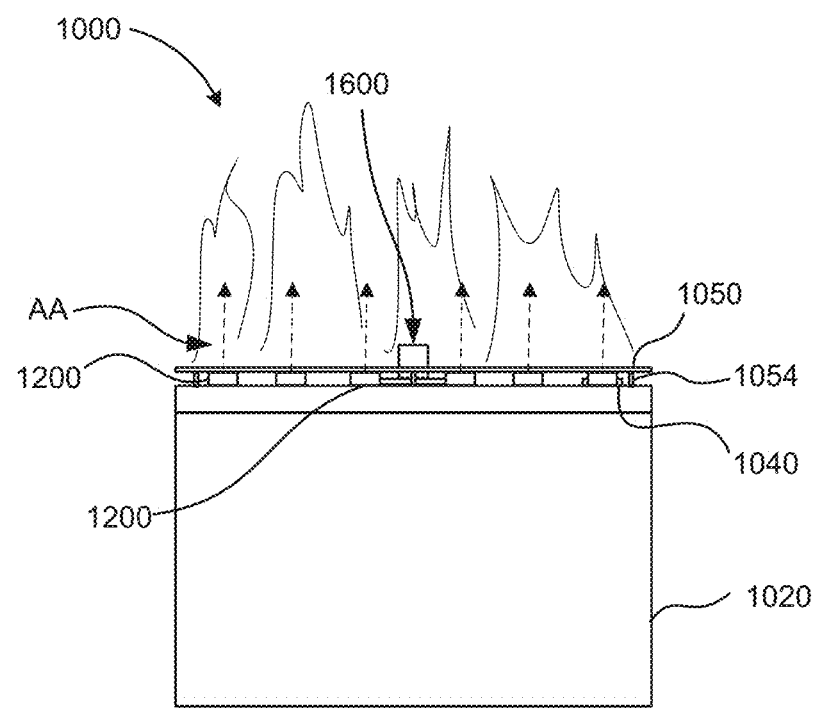
FIG. 5 is a back view of the fire simulation apparatus of FIG. 3 outputting the dynamic representation of the fire of FIG. 4.
Figure 6:
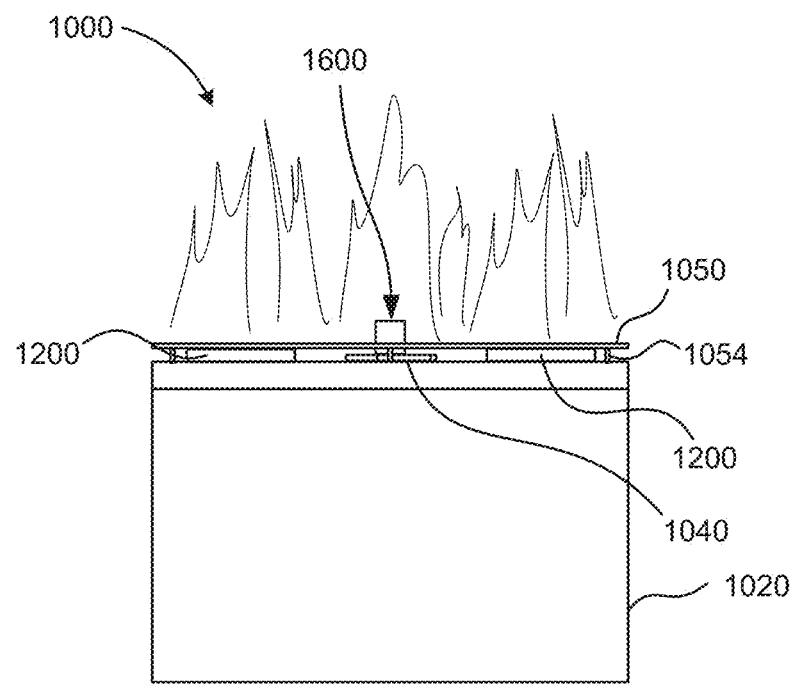
FIGS. 6 and 7 are side views of the fire simulation apparatus of FIG. 3 outputting the dynamic representation of the fire of FIG. 4.
Figure 7:
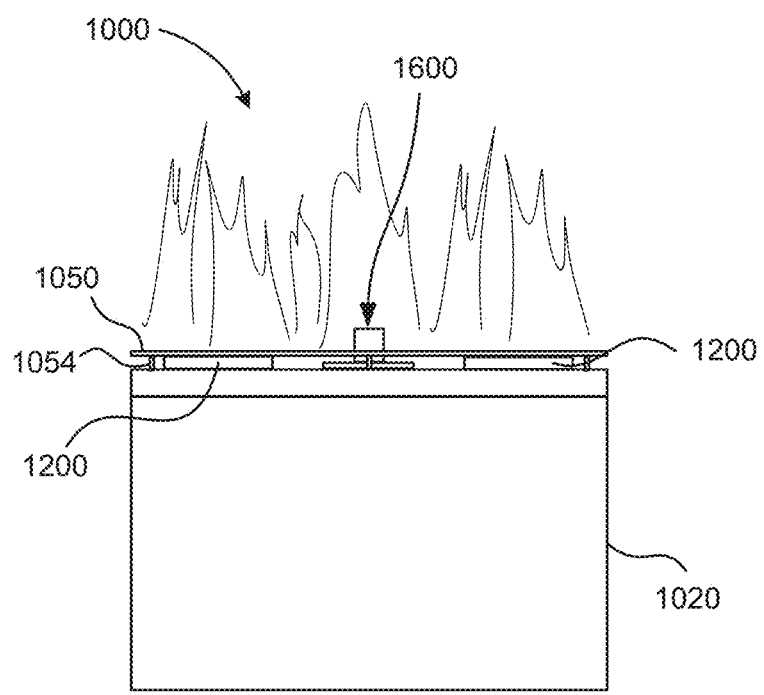
Figure 8:
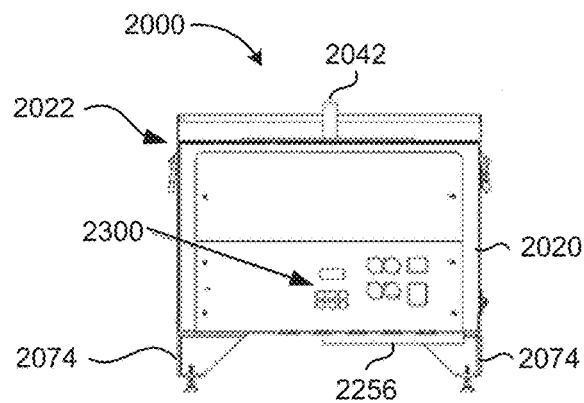
FIG. 8 is a front view of a fire simulation apparatus according to an embodiment.
Figure 9:
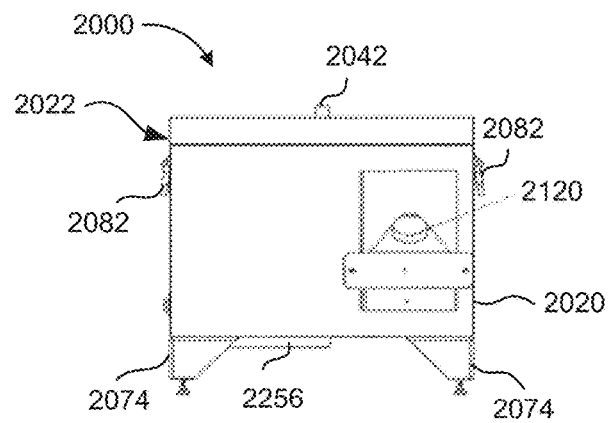
FIG. 9 is a back view of the fire simulation apparatus of FIG. 8.
Figure 10:
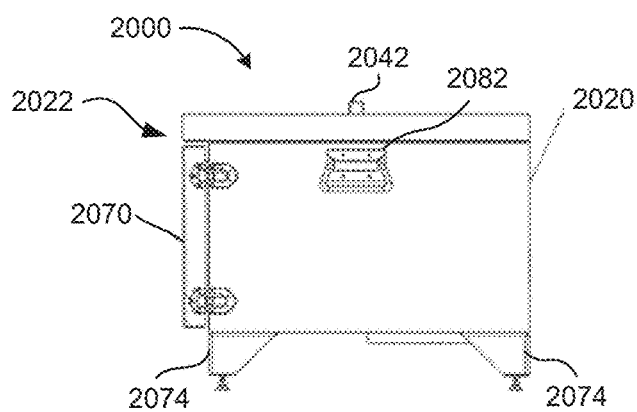
FIG. 10 is a side view of the fire simulation apparatus of FIG. 8.

The light emitters 1200 are configured to emit light towards a volume of space adjoining the housing 1020. In the embodiment of FIG. 3, the light emitters 1200 are configured to emit light in a direction parallel to, or the same as, the direction in which smoke is discharged from the housing 1020. More particularly, the light emitters 1200 can be configured to emit light towards at least a portion of the smoke discharged from the housing 1020. Said another way, the light emitters 1200 are configured to emit light towards a volume of space adjoining the housing, such as in a vertical direction with respect to (e.g., overhead of) the housing, represented by arrows AA in FIGS. 4-5. The light emitters 1200 are configured to emit the light such that the light is transmitted a non-zero distance beyond the upper surface 1026 of the housing 1020, for example up to five feet, up to ten feet, up to fifteen feet, or up to twenty feet or more beyond the surface of the housing 1020.

The portion of light transmitted through the smoke is configured to be redirected by at least a portion of the discharged smoke, which can cause the portion of smoke to visually appear as though it is glowing or illuminated. In this manner, the light emitted by the light emitters 1200 and the portion of smoke are collectively configured to simulate a flame or electric arc above the surface of the housing 1020. Said another way, the light emitters 1200, by the light emitted therefrom, and the smoke generator 1100, by the smoke generated and discharged therefrom, are collectively configured to produce a dynamic visual representation of a fire, as shown in FIGS. 6-9.

The light emitted by the light emitters 1200 and at least the portion of discharged smoke are collectively configured to simulate the flame or electric arc above the surface of the housing such that the simulated flame or electric arc is viewable from more than 180 degrees about the surface of the housing 1020. Said another way, the light and discharged smoke are collectively configured to produce a dynamic representation of a fire that is viewable from more than 180 degrees about a vertical axis or centerline of at least one of the apparatus 1000, the emitted light, or the surface of the housing 1020. In some embodiments, the dynamic representation of the fire (or the simulated flame or electric arc) is viewable from an angle within the range of more than 180 degrees up to 360 degrees (e.g., more than about 190 degrees, more than about 200 degrees, more than about 235 degrees, more than about 270 degrees, more than about 315 degrees. For example, in some embodiments, the dynamic representation of the fire (or the simulated flame or electric arc) is viewable from an angle within the range of 270 degrees to 360 degrees about the surface of the housing 1020. In another example, in some embodiments, the dynamic representation of the fire (or the simulated flame or electric arc) is viewable from about 360 degrees about the surface of the apparatus 1000, as shown in FIGS. 6-9.

The light emitters 1200 can be configured to selectively emit light having a predetermined set of characteristics. The light characteristics can include, but are not limited to, wavelength, intensity, color, pattern of emission (e.g., continuous mode, pulsating mode, intermittent mode, or the like), duration of emission, or the like. The characteristic(s) of the light can be determined, for example, based on one or more signals received by the light emitters 1200 from the controller 1300. In some embodiments, a predetermined program can be used to control the characteristics of the light.

The light emitters 1200 can be configured to emit light in any suitable color, including red, amber, white and blue. In some embodiments, the light emitters 1200 can be configured to emit multicolored light. For example, the light emitters 1200 can be configured to emit light having at least two different colors, including at least two of red, amber, white and blue. In another example, at least a first light emitter from the light emitters 1200 can be configured to emit light having a first color and at least a second light emitter from the light emitters 1200 can be configured to emit light having a second color, different from the first color. In another example, at least one light emitter of the light emitters 1200 can be configured to emit light in two or more colors.

The light color, or combination of colors, is configured to produce a simulated representation of a flame or electrical arc when the light is redirected (e.g., by smoke). For example, the light emitters 1200 can be configured to substantially concurrently emit red and amber colored light to produce a representation of a flame. In another example, the light emitters 1200 can be configured to substantially concurrently emit red, amber, blue and white colored light to produce a representation of a flame or flames having greater intensity or heat than a flame simulated with only red and amber lights. In yet another example, the light emitters 1200 can be configured to substantially concurrently emit blue and white colored light to produce a representation of an electrical arc.

The color of the light can be selectively emitted based on a signal received from the controller 1300. The color of the light can be modulated during use of the apparatus 1000 based on a signal received from the controller 1300. For example, the controller 1300 can send a signal to the light emitters 1200 to change the color of the light or combination of colors of the light during use.

The light emitter can be configured to change, during use, a characteristic of the light being emitted, such as based on the predetermined program and/or based on a signal received (e.g., during use) from the controller 1300. Said another way, the light emitters 1200 can be configured to emit at a first time (or during a first time period) light having a first set of characteristics and to emit light at a second time (or during a second time period), after the first time light having a second set of characteristics different from the first set of characteristics. In this manner, the characteristics of the light being emitted by the light emitters 1200 can be changed over time, which can be used to help simulate a fire that increases or decreases in intensity over time, to help simulate a resurgence of a fire, to help simulate a change in class of fire (e.g., from Class C to Class A) during a fire training scenario.

For example, the light emitters 1200 can be configured to emit at a first time light having a first set of characteristics, including blue and white colored light representative of an electrical fire. The light emitters 1200 can be configured to emit, at a second time, light having a second set of characteristics, including blue, white, red and amber colored light representative of an electrical fire that also includes combusted solids. The light emitters 1200 can be configured to emit at a third time, light having a third set of characteristics, including red and amber colored light, but no blue and white light, representative of extinguishment of the electrical component of the fire and continuance of the combustible solid fire (e.g., a change from a Class C to Class A fire).

In another example, the light emitters 1200 can be configured to emit, at a first time, light having a first set of characteristics, including a first intensity. The first intensity can be configured, for example, to represent an incipient stage fire. The light emitters 1200 can be configured to emit, at a second time after the first time, light having a second set of characteristics, including a second intensity greater than the first intensity. The second intensity can be configured, for example, to represent a growth stage or fully developed fire. The light emitters 1200 can be configured to emit at a second time light having a third set of characteristics, including a third intensity less than the second intensity, to represent a degree of extinguishment of the fire.

In still another example, the light emitters 1200, or a portion thereof, can be configured to be selectively turned on or off. For example, a first portion of the light emitters, having a first number of light emitters but not all of the light emitters, can emit light at a first time, and a second portion of the light emitters, having a different number of light emitters and optionally all of the light emitters, can emit light at a second time, before or after the first time.

A change in one or more characteristics of the light, movement of the discharged smoke (and thus a change in the redirection of the light thereon), and/or a change in one or more characteristics of the smoke during a simulated fire event can each help to produce the dynamic effect of the simulated fire. Said another way, a change in one of more of the light or the smoke helps to produce the illusion of that the simulated flame(s) and/or electric arc(s) are continuously moving or changing, as would a flame or electrical arc in a live fire.

The sound system 1500 of the apparatus 1000 is configured to enhance the realism of the fire simulation scenario, by providing a sound component to the training environment that includes at least one or more sounds that may be heard during a live fire event. In particular, the sound system 1500 is configured to output one or more sounds similar to sounds that firefighters are often trained to listen for during a search and rescue operation. For example, the sound system 1500 can be configured to output at least one sound associated with at least one class of fire. For example, the sound system 1500 can be configured to output from the apparatus 1000 a sound associated with a Class A fire or a Class B fire, such as a crackling, popping, or hissing sound. In another example, the sound system 1500 can be configured to output from the apparatus 1000 a sound associated with a Class C fire, such as an electrical arcing sound. In still another example, the sound system 1500 can be configured to output a sound associated with the environment in which the fire scenario is simulated to occur. Such sounds may include one or more of a crying baby, child, or person, a person screaming, a barking dog, a meowing cat, a sound of a structure falling or collapsing, or the like, or any combination thereof. The sound system 1500 can be configured to output one or more sounds associated with each of a Class A, Class B and Class C fire, as well as one or more sounds of associated with the environment in which the fire scenario is simulated to occur.

The sound system 1500 can include, for example, a sound player, an audio amplifier and a speaker (not shown in FIG. 3). The sound system 1500 is coupled to the housing 1020, and as shown in FIG. 3, is disposed within the interior volume of the housing 1020. A speaker of the sound system 1500 can be at least partially coupled to a surface (e.g., a side wall) of the housing 1020. The speaker can be impervious (e.g., waterproof) or liquid (e.g., water) resistant.

The sound player can be, for example, a digital sound player. The sound(s) can be included in at least one audio recording stored in, for example, at least one audio file in the sound player. In some embodiments, the sound player includes two or more audio recordings, each with a different sound or combination of sounds. For example, the sound player can be configured to play a first audio recording that includes at least one sound associated with a fire and to play a second audio recording that includes at least one sound associated with a person or animal. In use, the sound player can be configured to selectively output at least one audio recording from the two or more audio recordings.

In some implementations, the sound player is a multi-channel digital sound player. In this manner, the sound player can be configured to play one or multiple audio recordings (or sound file portions) during a predetermined time period. For example, the sound player can be configured to play a first audio recording that includes at least one sound associated with a fire and substantially concurrently play a second audio recording that includes at least one sound associated with a person or animal.

The sound system 1500 is configured to output the one or more audio recordings at a volume for the sound(s) to be heard by a person participating in the fire training scenario without the assistance of a hearing device, and at a predetermined distance from the apparatus 1000. For example, the sound system 1500 can be configured to output a sound(s) at a volume that permits the sound to be heard outside of a closed room or from a distance within the range of about 25 feet to about 1000 feet from the apparatus 1000.

The sound system 1500 can be configured to produce (output) a sound based on a signal received from the controller 1300. In some embodiments, the sound system 1500 can be selectively controlled by the controller 1300, as described in more detail herein. As such, the timing of output of the sound(s) can be coordinated by the controller (e.g., via a program) with smoke generation and light emission, to produce a desired or predetermined fire simulation scenario. Said another way, the sound system 1500 can be configured to output an audible representation of a fire during a time period that the smoke generator 1100 and light emitters 1200 collectively output a dynamic visual representation of the fire. In this manner, the apparatus 1000 is configured to substantially simultaneously output a dynamic visual and audible representation of the fire.

The apparatus 1000 includes a heating element 1600 coupled to the housing 1020. As shown in FIG. 3, in some implementations, the heating element 1600 is coupled to and at least partially extended from the upper surface 1026 of the housing 1020. The heating element 1600 can optionally also be extended through the diffuser 1050. The heating element 1600 is configured to generate heat such that the simulator can be seen or viewed at a distance via a thermal imaging camera. Because the heating element 1600 is extended upwardly from the upper surface 1026 of the housing, the heating element 1600 has better viewability via the thermal imaging camera from about 360 degrees about the heating element 1600. The heating element 1600 is distinct from the smoke generator 1100 and/or the light emitters 1200. The heating element 1600 is configured to generate an amount of heat (e.g., a "hot spot") representative of at least one of a fire or a body (e.g., a living body, such as a person or animal). For example, the heating element 1600 can generate a hot spot having a temperature within the range of about 100 degrees to about 1000 degrees Fahrenheit. More specifically, the heating element 1600 can generate a hot spot having a temperature, for example, of about 200 degrees Fahrenheit. In this manner, the apparatus 1000 is configured to facilitate fire fighter training that includes the use of thermal imaging equipment for search and rescue operations. In some implementations, a protective shield (e.g., a metal screen) (not shown in FIG. 3) is disposed about at least a portion of the heating element 1600 (e.g., the portion of the heating element 1600 extended above the diffuser 1050). The protective shield is configured to help avoid contact by a trainee, for example, directly with the heating element, thereby avoiding any burns that may otherwise occur if a person engaged the heating element when in use.

The heating element 1600 is thermostatically controllable. In some embodiments, the heating element 1600 is configured to be controlled or modulated by the controller 1300. In this manner, the heating element 1600 can be configured to generate the amount of heat in response to a signal from the controller 1300, to change (increase or decrease) the temperature of heat being generated by the heating element 1600 in response to a signal from the controller 1300 and/or cease generating heat in response to a signal from the controller 1300. The controller 1300 is configured to cause (or signal or trigger) the heating element 1600 to generate the amount of heat during a time period that is prior to, concurrent with, or subsequent to a time period during which the smoke generator 1100 and one or more light emitters 1200 collectively output a dynamic visual representation of a fire.

The apparatus 1000 includes a sensor 1400 configured to detect an extinguishing agent. In some implementations, the sensor 1400 is configured to detect a liquid extinguishing agent, such as water or a foam. In some implementations, the sensor 1400 is configured to detect a dry extinguishing agent, such as a powder or $CO_2$. The sensor 1400 can be configured to detect two or more types of extinguishing agents (e.g., to detect both a liquid agent and a dry agent), or a combination thereof. The sensor 1400 is coupled to the housing 1020 and is disposed within the interior volume of the housing 1020. More specifically, the sensor can be disposed within the bottom portion of the housing 1020, as shown in FIG. 3.

The housing 1020 is configured to receive an amount of extinguishing agent applied to the housing, such as during a fire training scenario, and to permit the amount of extinguishing agent to flow or otherwise move towards the sensor 1400. The housing 1020 includes a port 1060 or other suitable opening by which the housing is configured to receive at least a portion of the extinguishing agent. As shown in FIG. 3, in some implementations, the port 1060 is defined by the upper surface 1026 of the housing 1020 and is disposed beneath the diffuser 1050. In some embodiments, the surface of the housing 1020 can be configured to permit or otherwise cause an extinguishing agent applied thereon to flow towards the port 1060. For example, the surface of the diffuser 1050 can be sloped towards the port 1060, or can be contoured to cause a fluid (e.g., the extinguishing agent) thereon to flow or move towards the port 1060. As shown in FIG. 3, the diffuser 1050 can have an upper surface area less than a surface area of the upper surface 1026 of the housing 1020. In this manner, extinguishing agent applied to the apparatus 1000 in use can be received on a perimeter portion of the upper surface 1026 of the housing 1020, and then can flow on the upper surface 1026 of the housing 1020 between the diffuser 1050 and the housing 1020 towards the port 1060. The port 1060 is configured to receive at least a portion of an extinguishing agent when such extinguishing agent is applied to the apparatus 1000 (or at least the top portion 1022 of the apparatus).

The port 1060 is fluidically coupled to a drain opening (not shown in FIG. 3) located at a bottom portion 1024 of the housing 1020 via a tube or other suitable channel 1066. The sensor 1400 can be an in-line sensor (e.g., at least partially disposed within the channel 1066) or can be adjacent to the channel 1066, and is configured to detect the extinguishing agent in the channel 1066.

The sensor 1400 can be configured to detect the presence of the extinguishing agent. For example, the sensor 1400 can be configured to detect the presence or passage of the extinguishing agent within the channel 1066. The sensor 1400 can be configured to detect a predetermined amount of the extinguishing agent. For example, the sensor 1400 can be configured to detect a first predetermined amount of the extinguishing agent (e.g., at a first time), and a second predetermined amount of the extinguishing agent (e.g., at a second time different from the first time). The sensor 1400 can be configured to send a signal to the controller 1300 based on or in response to the detection of the predetermined amount (e.g., the first predetermined amount and/or the second predetermined amount) of the extinguishing agent. In some embodiments, the sensor 1400 can be configured to detect that a predetermined amount of the extinguishing agent has moved within the channel 1066. In some embodiments, the sensor 1400 is configured to detect a duration during which the extinguishing agent is present in the housing 1020 and/or moves through the channel 1066.

As described herein, characteristics of each of the smoke, light, sound and heat generated or otherwise produced or output by a component of the apparatus 1000 can be controlled by the controller 1300 of the apparatus 1000. Said another way, the controller 1300 is configured to control operation of the smoke generator 1100, the light emitters 1200, the sensor 1400, the sound system 1500, and/or the heating element 1600. The controller 1300 can be, for example, a logic controller, a logic processor, a PLC, a custom PCB, ASIC, or other suitable controller described herein, or the like. The controller 1300 is disposed within the interior volume 1030 of the housing 1020.

The controller can be programmed with one or more simulated fire scenarios, including, but not limited to, fire scenarios associated with one, two, three or more classes of fires (e.g., classes A, B and/or C). Said another way, the controller 1300 can be configured to execute a program associated with a fire scenario to be simulated such that the controller 1300 selectively sends one or more signals to the smoke generator 1100 to generate smoke during at least a portion of a time period having a predetermined set of characteristics, sends one or more signals to the light emitters 1200 to emit light during at least a portion of the time period having a predetermined set of characteristics, sends one or more signals to the sound system 1500 to output during at least a portion of the time period at least one audio recording, and/or sends one or more signals to the heating element 1600 to generate, during at least a portion of the time period, heat within a predetermined temperature range.

The controller 1300 can be configured to control the extinguishment difficulty level of the simulated fire. For a predetermined simulated fire scenario, the extinguishment-difficulty level of the simulated fire can be predetermined. The extinguishment-difficulty level can vary amongst different simulated fire scenarios, or amongst different levels of a predetermined simulated fire scenario, and can range from easy to difficult. For example, in some embodiments, the controller 1300 can determine a threshold amount of an extinguishing agent and can be configured to send a signal to the sensor 1400 indicative of the threshold amount of extinguishing agent to be detected by the sensor. An easy extinguishment-difficulty level for a simulated fire scenario can be associated with a low threshold amount being determined by the controller 1300. Similarly, a difficult extinguishment-difficulty level for a simulated fire scenario can be associated with a high threshold amount being determined by the controller 1300.

In some embodiments, the controller 1300 is configured to modulate operation of one or more components of the apparatus 1000 during a simulated fire scenario. For example, the controller 1300 can be configured to change at least one characteristic of the smoke, at least one characteristic of the light, at least one characteristic of the heat (e.g., temperature), and/or at least one characteristic of the sound (e.g., volume, or audio recording selection) based on a pre-programmed fire scenario instruction.

In some embodiments, the controller 1300 can be configured to modulate, or change, at least one of the smoke being generated, the light being emitted, the heat being generated, or the sound being output based on or in response to detection by the sensor 1400 of the first predetermined amount of the extinguishing agent. For example, the logic controller 1300 can be configured to modulate the light, the smoke, the heat, or the sound based on or in response to receipt of a first predetermined amount of the extinguishing agent by a predetermined portion of the housing 1020 (e.g., the port 1060 or the channel 1066). Modulation of the light can include causing the light emitters 1200 to change a characteristic of the light or causing the light emitters 1200 to cease emitting the light. Modulation of the smoke can include causing the smoke generator 1100 to change a characteristic of the smoke or causing the smoke generator 1100 to cease generating smoke. Modulation of the sound can include causing the sound system 1500 to change the volume at which the audio recording or sound is output and/or can include causing the sound system 1500 to output a different or additional audio recording. Modulation of the heat can include causing the heating element 1600 to generate heating having a different temperature or a temperature within a different range of temperatures.

For example, the controller 1300 can be configured to, in response to a signal from the sensor 1400 based on or in response to detection of the predetermined amount (e.g., a first amount) of the extinguishing agent, reduce the amount of light, change a color of the light, reduce the volume of smoke being generated over a predetermined time (e.g., volume of smoke per second or minute or hour), reduce the density of smoke being generated, decrease a volume of the audio recording output, cease outputting the audio recording, reduce the temperature of the heat generated by the heating element 1600, or the like, or any suitable combination of the foregoing, to simulate a degree of extinguishment of the simulated fire. In another example, the controller 1300 can be configured to, in response to a signal (e.g., a second or subsequent signal) from the sensor 1400 based on or in response to detection of the second predetermined amount of the extinguishing agent, cease emission of or reduce the amount of light, change a color of the light, cease smoke generation, reduce the volume of smoke being generated over a predetermined time (e.g., volume of smoke per second or minute or hour), reduce the density of smoke being generated, cease output of the audio recording, decrease the volume of the audio recording output, cease heat generation by the heating element 1600, or the like, or any suitable combination of the foregoing, to simulate a further degree of extinguishment or total extinguishment of the simulated fire.

Also, as described in more detail herein, in some embodiments, the apparatus 1000, for example, via the controller 1300, is configured to be operatively coupled to at least one other fire simulation device and/or a live fire training system. In some embodiments, the apparatus 1000, and in some embodiments, the controller 1300 particularly, is configured for wireless communication with at least one of a different fire simulation device, a live fire training system, or a remote controller.

The apparatus 1000 can be configured to selectively operate in various operational modes. Said another way, the apparatus 1000 can be configured to operate in a first operational mode during a first time period, and can be configured to operate in a second, different, operational mode during a second time period. More specifically, the controller 1300 of the apparatus 1000 can control operation of the apparatus 1000 according to the operational mode. Each operational mode can be associated with (e.g., implemented by) instructions executable by the controller 1300 for smoke generation, light emission, sound output, and/or heat generation according to predetermined characteristics based on the operational mode. The operational mode can be predefined or preprogrammed. In some embodiments, the operational mode is selected via the remote controller.

In one example, the apparatus 1000 can operate in an operational mode that is associated with a predetermined class (or combination of classes) of fire. The operational mode can also be associated with a predetermined difficulty level, which can be one of a range of difficulty levels between a beginner level of difficulty to an expert or impossible level of difficulty. The operational mode can also include one or more predetermined elements of surprise to be encountered by the firefighting trainee(s). Such elements of surprise can include, for example, a visual and/or audio simulation associated with a sudden fire burst or explosion, a spontaneous simulated re-ignition of a fire that visually appeared to have been extinguished, or the like. The operational mode can also include or be associated with a predetermined environment. For example, the operational mode can be associated with an inner city environment, which may include simulation of flames having a height representative of tall buildings, simulation of sounds (or playing audio recordings) associated with the city like traffic, crowds, or the like. Other predetermined environments can include an office building, house, hospital, school, forest, farm, or any other suitable environment. The controller 1300 can execute instructions associated with each of the foregoing features associated with the selected operational mode.

The controller 1300 can be configured to select one (e.g., based on an input by a user or a signal received from the remote controller, or the like) of the operational modes for execution. In use, as an example, a first operational mode can include instructions executable by the controller 1300 for simulating a Class A fire, with a beginner or lower level of difficulty (e.g., of extinguishment, such that sensor 1400 is configured to signal the controller 1300 that a first (e.g., low) predetermined threshold level of extinguishing agent has been detected by the sensor 1400), that includes zero or one element of surprise to be simulated (e.g. at a predetermined time or based upon a predetermined signal), and that is associated with a residential environment.

In another example, the apparatus 1000 can have a second operational mode with instructions executable by the controller 1300 for simulating Class A fire, with a moderate level of difficulty, a predetermined number (e.g., two or three) of elements of surprise, and associated with a commercial (e.g., office building) environment. In still another example, the apparatus 1000 can have a third operational mode with instructions executable by the controller 1300 for simulating a Class C fire, with an impossible level of difficulty (e.g., the apparatus 1000 is configured to continue the fire simulation regardless of any level of extinguishing agent detection by the sensor 1400).

An apparatus 2000 according to an embodiment is shown in FIGS. 8-12. The apparatus 2000 is configured to produce a fire training scenario, or portion thereof. In particular, for example, the apparatus 2000 is configured to output a dynamic visual and audible representation of a fire. The apparatus 2000 can be similar in many respects to apparatus 100, 200, and 1000 described herein, and components of the apparatus 2000, such as a housing 2020, smoke generator (not shown in FIGS. 8-12), light emitters 2200, controller 2300, sensor 2400, sound system 2500, and/or heating element (not shown in FIGS. 8-12) can be similar in many respects, or identical to, components of the apparatus 100, 200, 1000 (such as the housing 102, 202, 1020, smoke generator 110, 210, 1100, at least one light emitter 120, 220, 1200, controller 130, 230, 1300, sensor 240, 1400, sound system 250, 1500 and/or heating element 260, 1600, respectively), and so such components of apparatus 2000 and their operation are not described in detail with respect to apparatus 2000.

The apparatus 2000 includes a housing 2020 with an interior volume (not shown in FIGS. 8-12). The housing 2020 includes a door 2070. The door 2070 can be opened by an operator via hinges to access a control board or controller 2300 disposed in the housing 2020. The door 2070, when closed, can have a watertight seal to prevent or resist a liquid from contacting the controller 2300 and any other electronics therein during use.

The housing 2020 is configured to be disposed on a support surface, such as a floor, lawn, pavement, other ground surface, furniture, vehicle, equipment, or any other suitable support surface. The housing 2020 includes leg members 2074 configured to space a lower surface of the housing 2020 apart from the support surface, for example by one or more inches or one or more feet. The leg members 2074 can be individually adjustable in height, which can be helpful for disposing the housing 2020 on an uneven support surface. The housing can include handles 2082 configured to facilitate portability of the apparatus 2000.

The housing 2020 is configured to at least partially house, and in some implementations, wholly enclose, components of the apparatus, such as the smoke generator (not shown), the light emitter(s) 2200, the controller 2300, the sensor 2400, the sound system 2500, and/or the heating element (not shown).

The smoke generator 2100 of the apparatus 2000 is configured to generate smoke in any suitable manner described herein, and so such smoke generation is not described in detail with respect to apparatus 2000. The smoke generator 2100 can be configured to generate smoke using, for example theatrical smoke fluid (e.g., a mixture of water and propylene glycol). In some embodiments, the apparatus 2000, or the smoke generator 2100, includes a reservoir 2120 configured to contain a volume of the smoke fluid. The reservoir 2120 can be accessible from the exterior of the housing 2020. In this manner, the reservoir 2120 can be filled with smoke fluid without opening the housing 2020 to access the smoke generator within the interior volume.

The smoke generator is configured to discharge at least a portion of the smoke via a port 2042 of the housing 2020. The port 2042 is positioned with respect to the housing 2020 such that at least a portion of the smoke, when discharged, is positioned vertically above (e.g., directly overhead of) the housing 2020. The housing 2020 can optionally include a diffuser, similar in many respects to diffuser 1050 described with respect to apparatus 1000.

Figure 11:
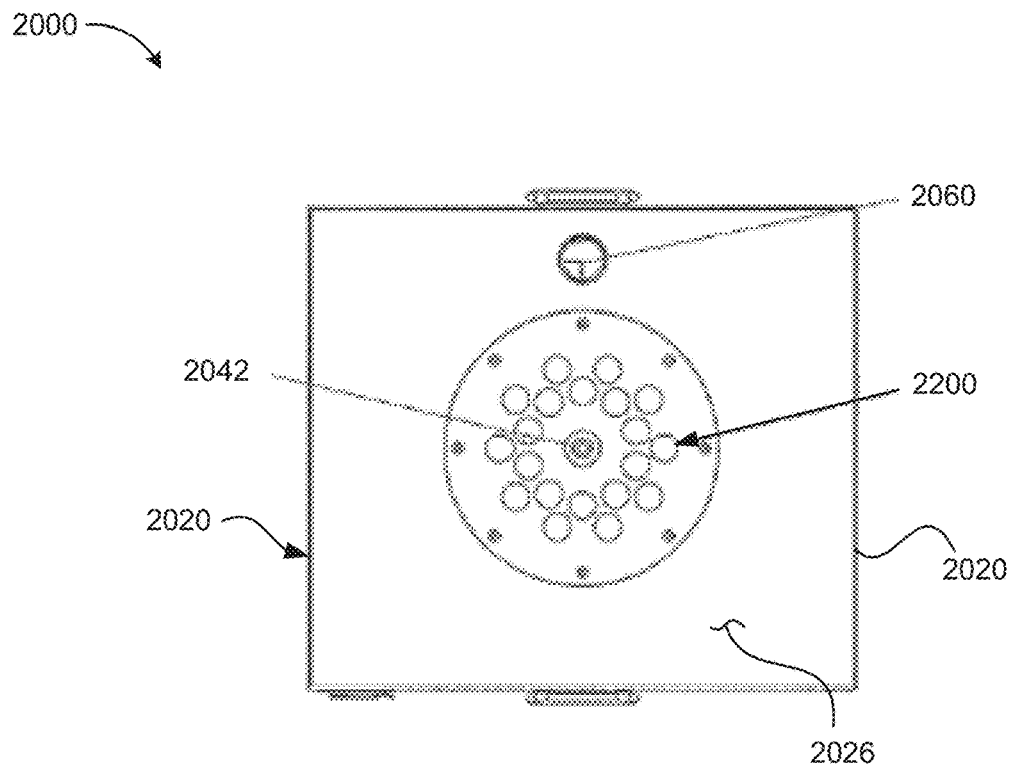
FIG. 11 is a top view of the fire simulation apparatus of FIG. 8.
Figure 12:
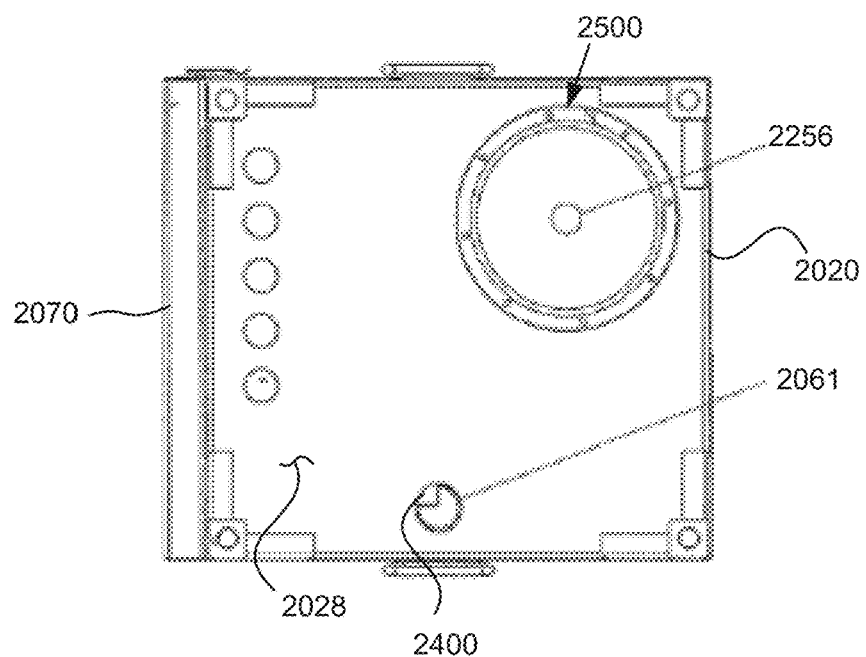
FIG. 12 is a bottom view of the fire simulation apparatus of FIG. 8.

The apparatus 2000 includes a set of light emitters 2200 configured to emit light to facilitate simulation of a dynamic representation of a fire, in combination with the smoke generator, as described herein. The light emitters 2200 are configured to emit light in any suitable manner described herein, and so such light emission is not described in detail with respect to apparatus 2000. The light emitters 2200 are disposed on an upper surface 2026 of the housing 2020. The light emitters 2200 can include one or more of a LED, a strobe light, a laser, an incandescent light bulb, a halogen lamp, a fluorescent light, fiber optics, or a combination thereof. As shown in FIG. 11, the light emitters 2200 are LEDs arranged in two substantially concentric circles. The port 2042 is positioned substantially at a center point of the circles.

The light emitters 2200 are configured to emit light towards at least a portion of the smoke discharged from the housing via the port 2042. Said another way, the light emitters 2200 are configured to emit light towards a volume of space adjoining the housing, such as in a vertical direction with respect to (e.g., overhead of) the housing. The light emitters 2200 are configured to emit the light such that the light is transmitted a non-zero distance beyond the upper surface 2026 of the housing 2020, for example up to five feet, up to ten feet, up to fifteen feet, or up to twenty feet or more beyond the surface of the housing 2020. The portion of light transmitted through the smoke is configured to be redirected by at least a portion of the discharged smoke, which can cause the portion of smoke to visually appear as though it is glowing or illuminated. In this manner, the light emitted by the light emitters 2200 and the portion of smoke are collectively configured to simulate a flame or electric arc above the surface of the housing. Said another way, the light emitters 2200, by the light emitted therefrom, and the smoke generator, by the smoke generated and discharged therefrom, are collectively configured to produce a dynamic visual representation of a fire.

The light emitted by the light emitters 2200 and at least the portion of discharged smoke are collectively configured to simulate the flame or electric arc above the surface of the housing such that the simulated flame or electric arc is viewable from an angle within the range of more than 180 degrees up to 360 degrees. More specifically, the dynamic representation of the fire (or the simulated flame or electric arc) can be viewable from about 360 degrees about the surface of the apparatus 2000.

The sound system 2500 of the apparatus 2000 is configured to enhance the realism of the fire simulation scenario, by providing a sound component to the training environment that includes at least one or more sounds that may be heard during a live fire event. The sound system 2500 can be similar in many respects to any sound system described herein, and so is not described in detail with respect to apparatus 2000. The sound system 2500 is configured to output at least one sound, such as a sound associated with at least one class of fire or a sound associated with the environment in which the fire scenario is simulated to occur (such as one or more of a crying baby, child, or person, a person screaming, a barking dog, a meowing cat, a sound of a structure falling or collapsing, or the like), or any combination thereof.

The sound system 2500 can include, for example, a sound player (not shown in FIGS. 8-12), an audio amplifier (not shown in FIGS. 8-12) and a speaker 2256. The speaker 2256 is coupled to a lower surface 2028 of the housing 2020. The speaker 2256 can be impervious (e.g., waterproof) or liquid (e.g., water) resistant. The leg members 2074 of the housing 2020 also space the speaker 2256 apart from the support surface, and thus also from at least some of the extinguishing agent that may accumulate on the support surface during a fire training scenario.

The apparatus 2000 can optionally include a heating element, such as a heating element described herein with respect to a fire simulation apparatus (e.g., apparatus 200, 1000).

The apparatus 2000 includes a sensor 2400 configured to detect an extinguishing agent. In some implementations, the sensor 2400 is configured to detect a liquid extinguishing agent, such as water or a foam. In some implementations, the sensor 2400 is configured to detect a dry extinguishing agent, such as a powder or $CO_2$. The sensor 2400 can be configured to detect two or more types of extinguishing agents (e.g., to detect both a liquid agent and a dry agent), or a combination thereof. The sensor 2400 is coupled to the housing 2020 and can be disposed towards a bottom portion of the housing 2020.

The housing 2020 is configured to receive an amount of extinguishing agent applied to the housing, such as during a fire training scenario, and to permit the amount of extinguishing agent to flow or otherwise move towards the sensor 2400. A top portion 2022 of the housing 2020 includes a port 2060 configured to receive at least a portion of the extinguishing agent. The port 2060 is fluidically coupled to a drain opening 2061 (FIG. 12) located at the bottom portion 1024 of the housing 2020. The sensor 2400 can be an in-line sensor. The sensor 2400 can be similar in many respects and can operate similarly to any sensor described herein, and so is not described in detail herein with respect to apparatus 2000.

The sensor 2400 can be configured to detect the presence of the extinguishing agent. For example, the sensor 2400 can be configured to detect the presence or passage of the extinguishing agent within the channel 1066. The sensor 2400 can be configured to detect one or more predetermined amounts of the extinguishing agent, and can be configured to send a signal to the controller 2300 based on or in response to the detection of one or more predetermined amounts of the extinguishing agent.

As described herein, characteristics of each of the smoke, light, sound and heat generated or otherwise produced or output by a component of the apparatus 2000 can be controlled by the controller 2300 of the apparatus 2000. Said another way, the controller 2300 is configured to control operation of the smoke generator, the light emitters 2200, the sensor 2400, the sound system 2500, and/or the heating element. The controller 2300 can be similar in many respects in form and operation to any controller described herein, and so is not described in detail with respect to apparatus 2000. The controller 2300 can be configured to modulate, or change, at least one of the smoke being generated, the light being emitted, the heat being generated, or the sound being output based on or in response to detection by the sensor 2400 of the first predetermined amount of the extinguishing agent. The controller 2300 can be configured to determine the one or more threshold amounts of extinguishing agent to be detected by the sensor 2400 during a particular fire training scenario.

As described in more detail herein, in some embodiments, the apparatus 2000, for example, via the controller 2300, is configured to be operatively coupled to at least one other fire simulation device and/or a live fire training system. In some embodiments, the apparatus 2000, and in some embodiments, the controller 2300 particularly, is configured for wireless communication with at least one of a different fire simulation device, a live fire training system, or a remote controller.

Figure 13:
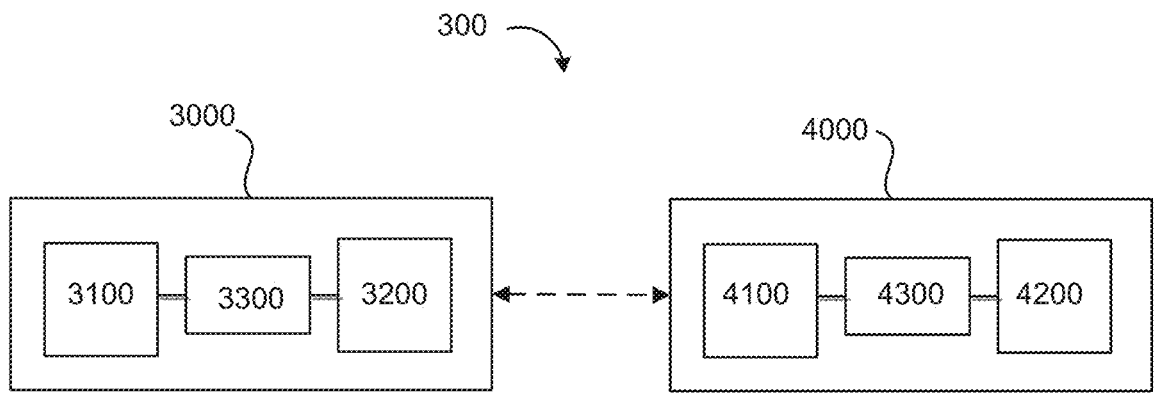
FIG. 13 is a schematic view of a fire training system according to an embodiment.

In some embodiments, at least one of the apparatus described herein (e.g., apparatus 100, 200, 1000, 2000) can be configured to be operatively coupled to another fire simulation device. For example, referring to FIG. 13, a fire training system 300 according to an embodiment includes a first apparatus 3000 and a second apparatus 4000. The first apparatus 3000 can be similar, or identical, to any apparatus (e.g., apparatus 100, 200, 1000, 2000) described herein. Similarly, the second apparatus 4000 can be similar, or identical, to any apparatus (e.g., apparatus 100, 200, 1000, 2000) described herein. The first apparatus 3000 and the second apparatus 4000 can be, but are not necessarily, substantially identical. Each apparatus 3000, 4000 can include at least a smoke generator 3100, 4100, a light emitter 3200, 4200 and a controller 3300, 4300, respectively, and can optionally include a sensor, a sound system, and/or a heating element (not shown in FIG. 13).

The first apparatus 3000 of the system 300 can be configured to output a dynamic representation of a fire. The first apparatus 3000, for example the controller 3300 of the first apparatus, is configured to send a signal to the second apparatus 4000, for example to a controller 4300 of the second apparatus. In some embodiments, the first apparatus 3000 is configured to send a signal associated with one or more of the dynamic conditions of the first apparatus to the second apparatus 4000. For example, the first apparatus 3000 can be configured to send to the second apparatus a signal associated with at least one of (1) an operating status of one or more of the smoke generator 3100, light emitter 3200, sensor, sound system, or heating element, (2) at least one characteristic of smoke being generated by the smoke generator, (3) at least one characteristic of light being emitted by the light emitter, (4) a predetermined threshold level of an amount of extinguishing agent which that sensor is configured to detect, (5) detection by the sensor of a predetermined amount of extinguishing agent, (6) an audio recording or file that was, is being, or will output by the sound system during a fire training scenario, (7) a temperature or temperature range of heat being generated or otherwise output by the heating element, or any combination of the foregoing.

The second apparatus 4000 of the system 300 can similarly be configured to output a dynamic representation of a fire. The second apparatus 4000 is configured to be in operative communication with the first apparatus 3000. The second apparatus 4000 can be configured to receive the signal from the first apparatus 3000. The second apparatus can be configured to, in response to the signal, at least one of (1) output the dynamic representation of the fire, (2)

change a characteristic of the dynamic representation of the fire, or (3) cease output of the dynamic representation of the fire.

For example, the first apparatus 3000 can be configured to send a signal to the second apparatus 4000 indicating that the light emitter(s) 3200 of the first apparatus are emitting light having a first set of characteristics and that the smoke generator 3100 of the first apparatus is generating smoke having a first set of characteristics. The second apparatus 4000, in response to the signal, can be configured to cause the smoke generator 4100 to generate smoke having the first set of characteristics and/or to cause the light emitter(s) to output light having the first set of characteristics. In some embodiments, the second apparatus 4000, in response to the signal, can be configured to cause the smoke generator 4100 to generate smoke having a second set of characteristics different than the first set of characteristics and/or to cause the light emitter(s) to output light having a second set of characteristics different than the first set of characteristics.

In another example, the first apparatus 3000 can be configured to send a signal to the second apparatus 4000 indicating that the sensor of the first apparatus detected a predetermined amount of extinguishing agent. The second apparatus 4000, in some embodiments, can be configured to, in response to the signal, change the dynamic conditions of the dynamic representation of the fire by the second apparatus 4000 such that the simulated fire appears to be diminished. In some embodiments, the second apparatus 4000, in response to the signal, can be configured to determine a threshold level of extinguishing agent to be detected by the sensor of the second apparatus 4000.

Similarly, the second apparatus 4000 can be configured to send a signal to the first apparatus 3000, and the first apparatus 3000 can be configured to, in response to the signal, at least one of (1) output the dynamic representation of the fire, (2) change a characteristic of the dynamic representation of the fire, or (3) cease output of the dynamic representation of the fire of the first apparatus. In some embodiments, each of the first apparatus 3000 and the second apparatus 4000 can be configured for wireless communication. For example, the apparatus 3000, 4000 can each include at least one of a wireless receiver or a transceiver, or the like. The wireless receiver can be coupled to a housing of the apparatus 3000, for example and be in operative communication with the controller 3300 (e.g., a logic controller) of the apparatus. The controller 3300 can be configured to receive, via the wireless receiver, a signal from a remote controller. The remote controller can be, for example, the other apparatus 4000 (or controller 4300 of the other apparatus). In another example, the remote controller can be a live fire training system or unit, or a controller thereof. In still another example, the remote controller can be, for example, a personal computer (PC), a personal digital assistant (PDA), a smart phone, a mobile phone, a laptop, a tablet PC, a server device, a workstation, a different fire simulator, or the like. In some embodiments, the remote controller allows for remote operation of at least one of the apparatus 3000, 4000 so that an instructor, for example, can initiate or change a simulated fire or fire condition remotely to present an element of surprise to a firefighting trainee who may be close to the at least one apparatus at the time it is remotely controlled.

In some implementations, the controller 3300, 4300 of one of the apparatus 3000, 4000 is configured to be, for a particular fire training scenario, the primary controller and the controller of the other apparatus can be a secondary controller or inactive (at least with respect to the other apparatus) during the fire training scenario. In this manner, for example the primary controller is configured to control operation of both apparatus 3000, 4000 during the fire training scenario, and can be considered a remote controller with respect to the other apparatus with the secondary controller.

Each of the apparatus 3000, 4000 can be used as a stand-alone fire simulator, to simulate a fire training scenario that includes multiple simulated fires that can interact with each other. In this manner, the apparatus 3000, 4000 are configured to simulate fire spread conditions within a structure, training prop, or other indoor or outdoor environment.

Figure 14:
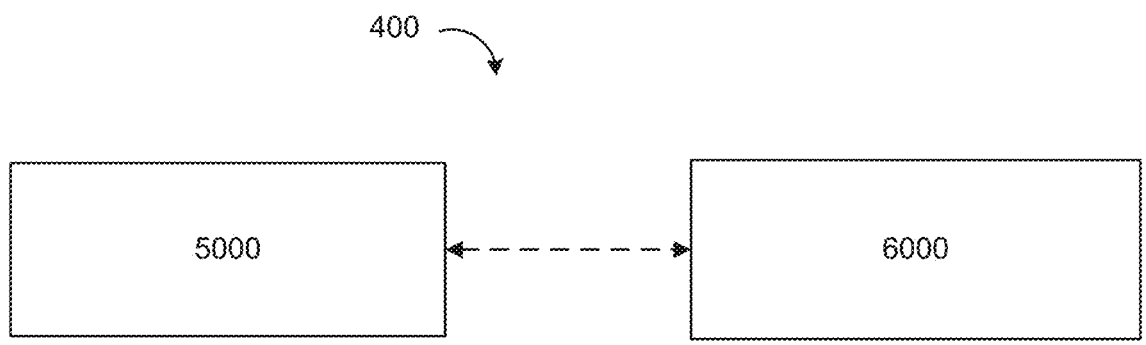
FIG. 14 is a schematic view of a fire training system according to an embodiment.

In some embodiments, at least one of the fire training apparatus described herein (e.g., apparatus 100, 200, 1000, 2000, 3000, 4000) can be configured to be included in or used in combination with a live fire training system. The live fire training system can be, for example, a system offered commercially by KFT Fire Trainer, LLC of Montvale, NJ. As shown in FIG. 14, a live fire training system 400 according to an embodiment includes a fire simulation apparatus 5000 and a live fire training unit 6000. The apparatus 5000 can be similar or identical to any of the fire training apparatus described herein (e.g., apparatus 100, 200, 1000, 2000, 3000, 4000), and so is not described in detail with respect to system 400. The live fire training unit is configured to produce a live fire. The live fire training unit 6000 is configured to be in operative communication with the apparatus 5000 such that the apparatus and the live fire training unit collectively generate a combination live and simulated fire training episode (or scenario). The apparatus 5000 and the live fire training unit 6000 can be configured to be in wired and/or wireless communication. As such, each of the apparatus 5000 and training unit 6000 can include a wireless receiver or transceiver. In some embodiments, at least one of the apparatus 5000 and the training unit 6000 is configured to be selectively operated in either the wired or wireless communication mode.

In some implementations, at least one of the fire training apparatus or training units described herein (e.g., apparatus 100, 200, 1000, 2000, 3000, 4000, 5000, or training unit 6000) includes a logic processor, which can be distinct from the controller (e.g., controller 130, 230, 1300, 2300, 4300). The logic processor is configured to facilitate interconnectivity with other fire simulation systems, training units or apparatus. For example, the logic processor can include Local Area Network ("LAN") capability. In this manner, the logic processor allows for operative integration of multiple fire simulators, training units, and/or systems, thereby allowing for expansion of a simulated fire scenario.

Each fire training apparatus described herein (e.g., apparatus 100, 200, 1000, 2000, 3000, 4000, 5000, or training unit 6000) can be portable. In this manner, the apparatus can be moved to various locations for various simulated fire scenarios, including indoor and/or outdoor locations. The housing (e.g., housing 102, 202, 1020, 2020) can have a size and the apparatus can have a weight allowing the apparatus to be readily moved using human strength (e.g., manually picked up and/or moved by one, two, or three persons). The apparatus, however, can be sufficiently heavy to help the device to remain in its position with respect to the support surface when the apparatus is attacked or impacted by a pressurized hose stream of an extinguishing agent.

In some implementations, the fire training apparatus includes one or more anchors configured to help maintain the position of the apparatus in a desired location (e.g., on the support surface) during a fire training scenario. The anchor(s) can help to maintain the position of the apparatus when the apparatus is attacked or impacted by a pressurized hose stream of an extinguishing agent (e.g., water or foam). The apparatus can also have a low profile (e.g., a greater width than height), which can also help the apparatus resist being moved in response to being impacted by or attacked with the pressurized stream of extinguishing agent.

The apparatus described herein can optionally include a power source, such as battery, which also lends to the portability of the apparatus. For example, in some implementations, the apparatus can include a battery pack (e.g., an external battery pack coupled to the apparatus) that is man-portable with and/or separate from the apparatus. The battery pack can be coupled to the apparatus in any suitable manner, e.g., by a cord, mounted directly to the housing, or the like. In some implementations, the apparatus includes an internal removable battery. The apparatus described herein can include a power cord configured to be plugged in or otherwise connected to AC power (e.g., via standard electrical lines). In some embodiments, an apparatus described herein can be configured to operate both via a portable power source and via a power cord.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having any combination or sub-combination of any features and/or components from any of the embodiments described herein. More particularly, unless the context clearly dictates otherwise, any embodiment described herein can include a particular feature and/or combinations of components described herein with respect to any other embodiment described herein.

For example, while the components are shown in FIG. 3 as being arranged within the housing 1020 in a particular configuration, in some embodiments, one or more of the components can be differently positioned with respect to the housing or another component within the housing.

In another example, although the housing (e.g., housing 1020, 2020) is shown and described herein as including two ports (e.g., ports, 1040, 1060 and 2040, 2060, respectively), in other embodiments, the container can include any suitable number of ports or openings, including, but not limited to, one, three, four or more ports or openings.

In still another example, although the port 1060 is shown and described with respect to apparatus 1000 as being disposed beneath the diffuser 1050, in other implementations, the port can be differently positioned with respect to the diffuser. In some implementations, the port is not disposed beneath or is partially disposed beneath by the diffuser. For example, the diffuser can be offset from the port. In some implementations, the diffuser can have a sloped or otherwise contoured surface configured to drain the extinguishing agent towards an opening in the diffuser in fluid communication with the port. In some implementations, the port can extend beyond the surface of the housing such that the port extends to and/or through the diffuser.

Moreover, the apparatus 100 can include at least one or more of a sound system, a sensor, or a heating element, such as those described with respect to other embodiments herein.

The specific configurations of the various components described herein can also be varied. For example, the size and specific shape of the various components can be different from the embodiments shown, while still providing the functions as described herein. Additionally, the relative size of various components of the devices shown and described herein with respect to the size of other components of the devices are not necessarily to scale.

Similarly, where methods and/or events described above indicate certain events and/or procedures occurring in certain order, the ordering of certain events and/or procedures may be modified. While the embodiments have been particularly shown and described, it will be understood that various changes in form and details may be made.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

What is claimed is:

1. An apparatus, comprising:
   a housing having an external surface and an interior volume, the external surface of the housing including a port configured to fluidically couple at least a portion of the interior volume of the housing with an exterior of the housing;
   a plurality of light emitters arranged on the external surface of the housing, the port positioned within the plurality of light emitters, the plurality of light emitters configured to collectively emit light;

a smoke generator at least partially disposed within the interior volume of the housing, the smoke generator configured to selectively generate smoke, the port configured to permit at least a portion of the smoke to be discharged from the smoke generator to the exterior of the housing, the light and the at least the portion of the smoke collectively configured to simulate a flame or an electric arc above the external surface of the housing such that the simulated flame or the simulated electric arc is viewable above and from more than 180 degrees about the external surface of the housing; and a controller operably coupled to the plurality of light emitters and to the smoke generator, the controller configured to cause modulation of at least one of the light or the smoke, during operation of the apparatus.

2. The apparatus of claim 1, wherein the light and the at least the portion of smoke are collectively configured to simulate the flame or the electric arc above the external surface of the housing such that the simulated flame or the simulated electric arc is viewable from an angle within a range of 270 degrees to 360 degrees about the external surface of the housing.

3. The apparatus of claim 1,
wherein a fan disposed in the housing is configured to facilitate discharging the at least the portion of the smoke.

4. The apparatus of claim 1, wherein the controller is configured to cause modulation of a characteristic of the light and a characteristic of the smoke, during operation, to change an appearance of the simulated flame or the simulated electric arc.

5. A fire training system comprising the apparatus of claim 1, the fire training system further comprising:
a live fire training unit configured to produce a live fire, the live fire training unit being in operative communication with the apparatus such that the apparatus and the live fire training unit collectively generate a combination live and simulated fire training episode.

6. The apparatus of claim 1, further comprising:
a heating element at least partially disposed within the housing, the heating element being distinct from the plurality of light emitters, the heating element configured to generate an amount of heat representative of at least one of a fire or a living body and such that the heating element is viewable by a thermal imaging camera.

7. The apparatus of claim 1, further comprising:
a sound system coupled to and at least partially disposed within the housing, the sound system configured to output, during operation, a sound based on a signal received from the controller, the sound includes at least one of a sound associated with a class of fire or a sound associated with an environment of a live fire event.

8. The apparatus of claim 1, wherein, during operation, the plurality of light emitters emits the light in a pulsating mode concurrently with the at least the portion of the smoke being discharged to the exterior of the housing, the apparatus including a fan configured to facilitate discharge of the at least the portion of the smoke.

9. The apparatus of claim 1,
wherein, at a first time during operation, the plurality of light emitters substantially concurrently emits light having at least two colors, the at least two colors including at least two of red, amber, blue or white, the controller configured to cause modulation of at least one characteristic of the light at a second time during operation, the at least one characteristic of the light including at least one of color, wavelength, intensity, pattern of emission, or duration of emission.

10. The apparatus of claim 1, further comprising:
a wireless receiver coupled to the housing and in operative communication with the controller, the controller configured to receive a signal from a remote controller via the wireless receiver, the signal received from the remote controller configured to cause the controller to cause modulation of at least one characteristic of the light or the smoke.

11. The apparatus of claim 1, further comprising:
a diffuser coupled to the external surface of the housing such that the diffuser is spaced apart from the external surface of the housing and such that the diffuser is disposed over and spaced apart from the port, the diffuser configured to change a direction of movement of at least a portion of the at least the portion of the smoke to widen a base portion of the simulated flame or the simulated electric arc.

12. A method, comprising:
emitting light from a plurality of light emitters coupled to a housing, the plurality of light emitters having a distribution across a portion of an external surface of the housing;

discharging a portion of smoke from a smoke generator at least partially disposed within an interior volume of the housing through a port of the housing, the port being positioned at the external surface of the housing within the distribution of the plurality of light emitters, the emitted light and the discharged portion of the smoke collectively producing a dynamic representation of a fire, the dynamic representation of the fire being viewable above and from more than 180 degrees about the external surface of the housing; and modulating, the smoke such that the dynamic representation of the fire is changed.

13. The method of claim 12, further comprising:
modulating at least one characteristic of the light, the modulating including at least one of changing the at least one characteristic of the light or ceasing the emitting.

14. The method of claim 12, further comprising:
facilitating, by a fan disposed in the housing, the discharging of the portion of the smoke.

15. The method of claim 12, further comprising:
causing, via a diffuser coupled to and spaced apart from the external surface of the housing, at least a portion of the discharged portion of the smoke to change a direction of movement to widen the distribution of the discharged portion of the smoke.

16. The method of claim 12, further comprising:
generating, via a heater at least partially disposed within the housing and distinct from the plurality of light emitters, an amount of heat representative of at least one of a fire or a living body such that the heater is viewable by a thermal imaging camera.

17. The method of claim 12, wherein the port is a first port, the method further comprising:
directing, via the external surface of the housing, at least a portion of an extinguishing agent received on the external surface of the housing towards a second port of the housing.

18. The method of claim 12, wherein the port is a first port, the method further comprising:
   directing, via a diffuser coupled to and spaced apart from the external surface of the housing, at least a portion of an extinguishing agent received on the diffuser towards a second port of the housing.

19. The method of claim 12, wherein the emitting includes emitting the light in a pulsating mode during at least a portion of the emitting.

20. The method of claim 12, wherein the emitted light and the discharged portion of the smoke are collectively configured to produce the dynamic representation of the fire vertically disposed with respect to the housing such that the dynamic representation of the fire is viewable from an angle within a range of 270 degrees to 360 degrees about the external surface of the housing.

\* \* \* \* \*